US008887216B2

(12) United States Patent
Liu et al.

(10) Patent No.: US 8,887,216 B2
(45) Date of Patent: Nov. 11, 2014

(54) SYSTEM AND METHOD OF DELIVERING VIDEO CONTENT

(75) Inventors: Kuo-Hui Liu, San Ramon, CA (US); Yongdong Zhao, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 43 days.

(21) Appl. No.: 13/609,579

(22) Filed: Sep. 11, 2012

(65) Prior Publication Data
US 2013/0007825 A1 Jan. 3, 2013

Related U.S. Application Data

(63) Continuation of application No. 11/810,385, filed on Jun. 4, 2007, now Pat. No. 8,291,463.

(51) Int. Cl.
| | |
|---|---|
| H04N 7/173 | (2011.01) |
| H04N 21/438 | (2011.01) |
| H04N 21/643 | (2011.01) |
| H04N 21/6405 | (2011.01) |
| H04N 21/222 | (2011.01) |
| H04N 21/231 | (2011.01) |

(52) U.S. Cl.
CPC ..... *H04N 21/64322* (2013.01); *H04N 21/4384* (2013.01); *H04N 21/6405* (2013.01); *H04N 21/2221* (2013.01); *H04N 21/23106* (2013.01)
USPC .......................................................... 725/94

(58) Field of Classification Search
None
See application file for complete search history.

(56) References Cited

U.S. PATENT DOCUMENTS

| | | | |
|---|---|---|---|
| 6,798,769 | B1 | 9/2004 | Farmwald |
| 7,596,799 | B2 | 9/2009 | Chen |
| 7,761,902 | B2 | 7/2010 | Liu et al. |
| 2006/0080724 | A1 | 4/2006 | Vermeiren et al. |
| 2006/0230176 | A1 | 10/2006 | Dacosta |
| 2007/0089145 | A1 | 4/2007 | Medford et al. |
| 2007/0121612 | A1 | 5/2007 | Nadeau et al. |
| 2007/0192812 | A1* | 8/2007 | Pickens et al. ................... 725/94 |
| 2007/0242668 | A1 | 10/2007 | Barrett |
| 2007/0250635 | A1* | 10/2007 | Hamilton et al. ............. 709/231 |
| 2008/0046584 | A1* | 2/2008 | Tucker ......................... 709/231 |
| 2008/0059724 | A1 | 3/2008 | Stifter, Jr. |
| 2008/0288458 | A1* | 11/2008 | Sun et al. .......................... 707/3 |
| 2008/0301745 | A1 | 12/2008 | Liu et al. |
| 2009/0044242 | A1 | 2/2009 | Ramakrishnan et al. |

OTHER PUBLICATIONS

Non-Final Office Action for U.S. Appl. No. 11/810,385 mailed Oct. 1, 2009, 33 pages.
Final Office Action for U.S. Appl. No. 11/810,385 mailed May 26, 2010, 34 pages.
Notice of Allowance for U.S. Appl. No. 11/810,385 mailed Jun. 11, 2012, 48 pages.

* cited by examiner

*Primary Examiner* — Nathan Flynn
*Assistant Examiner* — Omar S Parra
(74) *Attorney, Agent, or Firm* — Toler Law Group, PC

(57) ABSTRACT

A method includes receiving data from a set-top box device at an access system via an access network, the data indicating a selection of a channel at the set-top box device, the data including a multicast group address. The method also includes sending copies of video data packets of the channel from the access system for storage in a first-in first-out cache associated with the channel. The method further includes automatically connecting the set-top box device to a multicast stream of the selected channel after a particular number of video data packets are sent to the set-top box device from the cache. The particular number of video data packets corresponds to a time period between communicating successive random access point packets of the channel and is less than a capacity of the cache.

20 Claims, 17 Drawing Sheets

SYSTEM AND METHOD OF DELIVERING VIDEO CONTENT

CROSS-REFERENCE TO RELATED APPLICATIONS

The present application is a continuation of and claims priority from U.S. patent application Ser. No. 11/810,385, issued as U.S. Pat. No. 8,291,463, filed Jun. 4, 2007, the content of which is expressly incorporated herein by reference in its entirety.

FIELD OF THE DISCLOSURE

The present disclosure is generally related to delivering video content.

BACKGROUND

Television provides information and entertainment to many viewers. New technologies, such as Internet Protocol Television (IPTV), enable service providers to offer a large number of channels that allow viewers to select from a wide variety of programming. Viewers often change channels during commercials, when a program is scheduled to begin, or to find a desired channel. When changing a channel within an IPTV system, a set-top box device or other receiver has to wait for the arrival of a particular frame, such as a random access point (RAP) frame, before it can start to decode and play the video. This tuning delay can be exacerbated by other delays, such as DTS/STC delay and buffering delay for lost packet recovery. As a result, after a channel change command is issued, a new channel may not be displayed for a relatively long time. Such a long waiting delay for channel change can be frustrating to viewers, especially when they desire to quickly review the content displayed on multiple channels. Accordingly, there is a need for an improved system and method of delivering video content.

DETAILED DESCRIPTION

Figure 1:
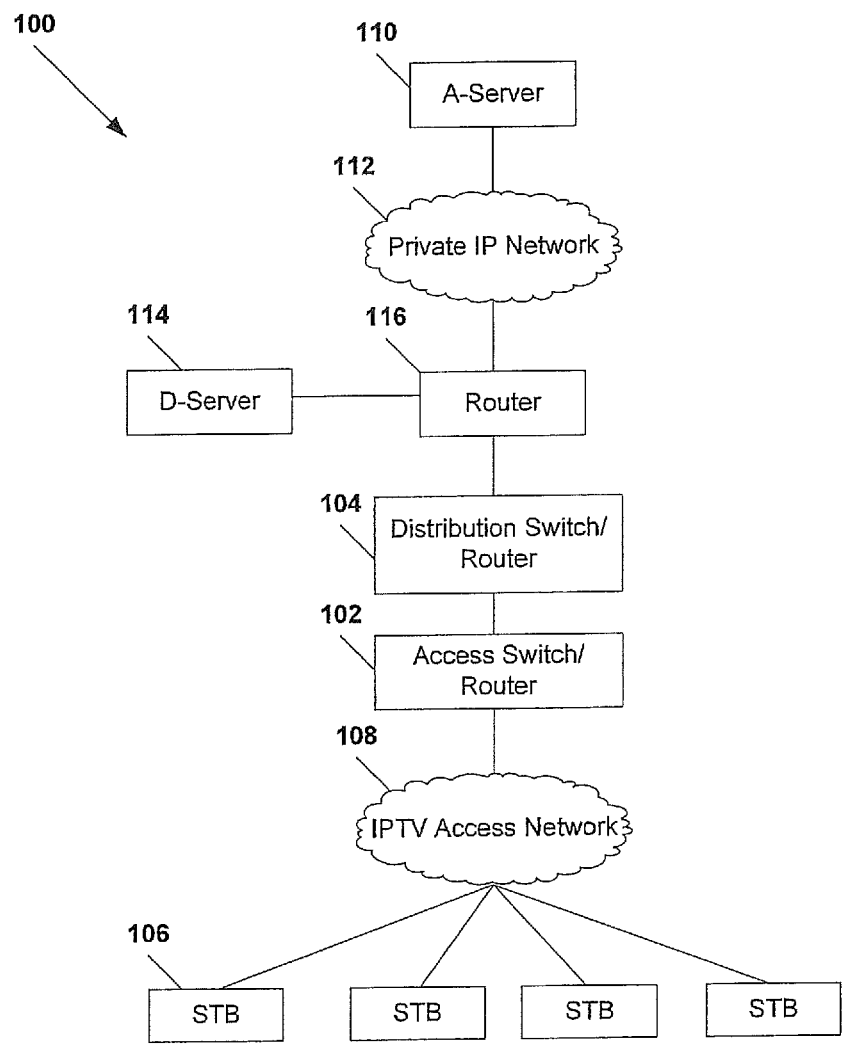
FIG. 1 is a block diagram of a particular embodiment of a system to deliver video content.

In a particular embodiment, a method includes receiving data from a set-top box device at an access system via an access network, the data indicating a selection of a channel at the set-top box device, the data including a multicast group address. The method also includes sending copies of video data packets of the channel from the access system for storage in a first-in first-out cache associated with the channel. The method further includes automatically connecting the set-top box device to a multicast stream of the selected channel after a particular number of video data packets are sent to the set-top box device from the cache. The particular number of video data packets corresponds to a time period between successive random access point packets of the channel and is less than a capacity of the cache.

In another particular embodiment, a non-transitory computer-readable medium stores instructions that, when executed by a computer, cause the computer to perform a method that includes receiving data from an access system at a distribution system of an Internet protocol television network. The data indicates a selection of one of a plurality of internet protocol television channels at a set-top box device. The data includes a multicast group internet protocol address. The method also includes sending copies of video data packets of the selected internet protocol television channel from the distribution system to a video caching memory accessible to the access system. Copies of the video data packets are accessible to the set-top box device via the access system, the video caching memory including a first-in first-out cache. The method further includes determining that no set-top box devices are receiving the selected internet protocol television channel and deleting the first-in first-out cache in response to the determination.

In another particular embodiment, a system includes a processor and a plurality of caches. Each cache is configured to store video data packets of one of a plurality of television channels and has a cache address. The system also includes a memory storing instructions executable by the processor to receive data indicating a selection of one of the plurality of television channels by a set-top box device from an access system. The instructions are also executable by the processor to generate a particular cache address based on a multicast group address included in the data indicating the selected television channel. The instructions are further executable by the processor to search the plurality of caches for the particular cache address and to send copies of the stored video data packets of the selected television channel to the access system. The copies of the video data packets are accessible to the set-top box device via the access system. The instructions are executable by the processor to delete a particular cache associated with a particular television channel in response to determining that no set-top box devices in communication with the access system are tuned to the particular television channel.

Referring to FIG. 1, a particular embodiment of a system to deliver video content is illustrated and designated generally 100. The system 100 includes an access switch/router system 102 of an Internet Protocol Television (IPTV) network. The access switch/router system 102 can include one or more servers, one or more routers, one or more switches, or any combination thereof. In one embodiment, the access switch/router system 102 can be included at a digital subscriber line access multiplexer (DSLAM). The access switch/router system 102 communicates with a distribution switch/router system 104, which may be located at a central office facility of the IPTV network. The distribution switch/router system 104 can include one or more servers, one or more routers, one or more switches, or any combination thereof. Further, the access switch/router system 102 communicates with a plurality of set-top box devices 106 via an IPTV access network 108.

The distribution switch/router system 104 communicates with one or more video content acquisition servers, such as the A-server 110, via a private IP network 112. In an illustrative embodiment, the distribution switch/router system 104 can communicate with the private IP network 112 via a router 116. The router 116 can communicate with a designated server, such as the D-server 114, that handles packet loss events or provides other functions of the IPTV network.

The distribution switch/router system 104 caches recent data associated with the channels received from A-servers, such as the A-server 110. For example, the distribution switch/router system 104 can cache data associated with a plurality of channels made available by a service provider to the set-top box devices 106. The distribution switch/router system 104 creates a caching memory to store data associated with each channel. For instance, when the distribution switch/router system 104 is powered up, it can create a caching first-in first-out (FIFO) memory for each channel, in which packets stored first are read out first. The packets can be encapsulated with a multicast group IP address of a channel as the destination IP address and an IP address of the A-Server 110 as the source IP address. The distribution switch/router system 104 can send cached data for a channel to the access switch/router system 102 in response to a request from the access switch/router system 102. Once cached data for the channel is sent to the access switch/router system 102, the distribution switch/router system 104 can connect the access switch/router system 102 with a multicast stream sent by the A-server 110 for the channel.

The access switch/router system 102 caches data packets associated with those channels viewed via the set-top box devices 106. This can include fewer channels than the channels cached at the distribution switch/router system 104. In a particular embodiment, the access switch/router system 102 can store data associated with channels that are statically cached at the access switch/router system 102 whether or not any subscribers are watching the channels. Statically cached channels can be selected based on their popularity, such as local channels, news channels, sports channels, or other channels. The access switch/router system 102 can dynamically store data for one or more channels that are not statically cached, when one or more of the set-top box devices 106 are tuned to such channels. Statically cached channels are sometimes referred to herein as "static channels." Dynamically cached channels are sometimes referred to herein as "dynamic channels."

The access switch/router system 102 can acquire data associated with the statically cached channels when it powers up. For instance, the access switch/router system 102 can send an Internet Group Multicast Protocol (IGMP) Join packet to the distribution switch/router system 104 to acquire data associated with each static channel. When a dynamic channel is requested for the first time by a set-top box device 106, the access switch/router system 102 can send a proxy IGMP Join packet associated with the requested channel to the distribution switch/router system 104 and create a cache for the channel after the data of the channel arrives from the distribution switch/router system 104. When there are no set-top box devices 106 receiving data associated with the dynamic channel, its cache can be deleted at the access switch/router system 102.

In an illustrative embodiment, data associated with each IPTV channel can be cached via a separately addressed FIFO memory portion (a "caching FIFO") at the access switch/router system 102. Each caching FIFO can be sized to accommodate a configurable amount of data packets. For instance, the amount of data packets can be configured to account for the buffering requirements of the RAP packets. Each time an IPTV multicast packet is received at the access switch/router system 102, an additional copy of the packet is created for channel caching. In a particular embodiment, the access switch/router system 102 can generate a caching FIFO address based on the multicast group IP address in the destination IP address header of the packet. The generated FIFO address can be used to determine which caching FIFO at the access switch/router system 102 stores data associated with the channel corresponding to the received packet. The packet can then be cached at the identified caching FIFO.

To change a channel, a set-top box device 106 sends an IGMP Join packet to the access switch/router system 102. The IGMP Join includes the multicast group IP address for the requested IPTV channel. When the access switch/router system 102 receives the IGMP Join packet, the access switch/router system 102 extracts the multicast group LP address and determines which channel the set-top box device 106 is requesting. Further, the access switch/router system 102 determines whether a caching FIFO corresponding to the requested channel exists at the access switch/router system 102. For instance, the access switch/router system 102 can generate a FIFO address based on the multicast group IP address and determine whether a caching FIFO exists at the access switch/router system 102 that corresponds to the generated address. If the access switch/router system 102 finds a caching FIFO corresponding to the channel, the access switch/router system 102 sends the data stored at the caching FIFO, from the first RAP packet to the end of the FIFO, to the set-top box device 106 as fast as the bandwidth of the IPTV access network 108 allows (i.e., without impacting video transmission to other set-top box devices). After sending the cached data for the requested channel, the access switch/router system 102 connects the set-top box device 106 to the multicast stream of the requested channel sent by the A-server 110.

On the other hand, if the access switch/router system 102 does not currently cache data associated with a channel requested by a set-top box device 106, the access switch/router system 102 generates a proxy IGMP Join on behalf of the set-top box device 106 and forwards the proxy IGMP Join request to the distribution switch/router system 104. In response to the proxy IGMP Join request, the distribution switch/router system 104 sends the cached data packets of the requested channel to the access switch/router system 102. In a particular embodiment, the distribution switch/router system 104 can use a maximum bandwidth available to send packets to the access switch/router system 102, such that channel change delay can be minimized. After the packets cached for a requested channel are sent from the distribution switch/router system 104 to the access switch/router system 102, the distribution switch/router system 104 connects the access switch/router system 102 to the A-server multicast stream.

When packets of the channel arrive from the distribution switch/router system 104, the access switch/router system 102 creates a caching FIFO for the channel and caches the packets in the created FIFO with a RAP packet at the beginning. The access switch/router system reads out the cached packets to the set-top box device 106 requesting the channel. After the cached packets are sent from the access switch/router system 102 to the set-top box device 106, the access switch/router system 102 stops sending packets from the cache FIFO and connects the set-top box device 106 to the A-server multicast stream.

Figure 2:
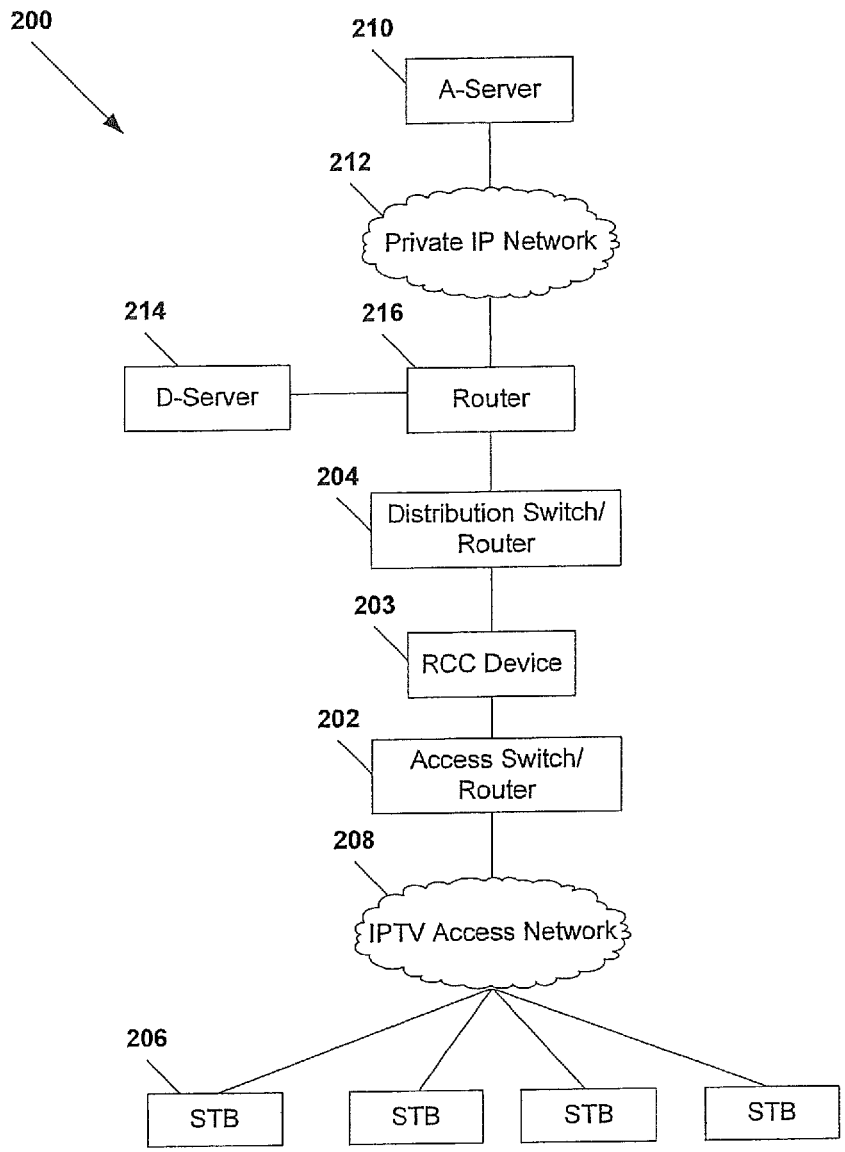
FIG. 2 is a block diagram of a second particular embodiment of a system to deliver video content.

Referring to FIG. 2, a second particular embodiment of a system to deliver video content is illustrated and designated generally 200. The system 200 includes an access switch/router system 202 of an Internet Protocol Television (IPTV) network. The access switch/router system 202 can include one or more servers, one or more routers, one or more switches, or any combination thereof. In one embodiment, the access switch/router system 202 can be included at a digital subscriber line access multiplexer (DSLAM). The access switch/router system 202 communicates with a rapid channel change device 203, which communicates with a distribution switch/router system 204. In an illustrative embodiment, the distribution switch/router system 204 may be located at a central office facility of the IPTV network. The distribution switch/router system 204 can include one or more servers, one or more routers, one or more switches, or any combination thereof. Further, the access switch/router system 202 communicates with a plurality of set-top box devices 206 via an IPTV access network 208.

The distribution switch/router system 204 communicates with one or more video content acquisition servers, such as the A-server 210, via a private IP network 212. In an illustrative embodiment, the distribution switch/router system 204 can communicate with the private IP network 212 via a router 216. The router 216 can communicate with a designated server, such as the D-server 214, that handles packet loss events or provides other functions of the IPTV network.

The distribution switch/router system 204 caches recent data associated with channels received from A-servers, such as the A-server 210. For example, the distribution switch/router system 204 can cache data associated with the channels available from a service provider to the set-top box devices 206. The distribution switch/router system 204 creates a caching memory to store data associated with each channel. For instance, when the distribution switch/router system 204 is powered up, it can create a caching first-in first-out (FIFO) memory for each channel, in which packets stored first are read out first. The packets can be encapsulated with a multicast group IP address of a channel as the destination IP address and an IP address of the A-Server 210 as the source IP address. The distribution switch/router system 204 can send cached data for a channel to the access switch/router system 202 in response to a request from the access switch/router system 202. Once the cached data for the channel is sent to the access switch/router system 202, the distribution switch/router system 204 can connect the access switch/router system 202 with a multicast stream sent by the A-server 210 for the channel.

The rapid channel change device 203 caches data packets associated with those channels viewed via the set-top box devices 206. This can include fewer channels than the channels cached at the distribution switch/router system 204. In a particular embodiment, the rapid channel change device 203 can store data associated with channels that are statically cached at the rapid channel change device 203 whether or not any subscribers are watching the channels. Statically cached channels can be selected based on their popularity, such as local channels, news channels, sports channels, or other channels. The rapid channel change device 203 can dynamically store data for one or more channels that are not statically cached, when one or more of the set-top box devices 206 are tuned to such channels. Statically cached channels are sometimes referred to herein as "static channels." Dynamically cached channels are sometimes referred to herein as "dynamic channels."

The rapid channel change device 203 can acquire data associated with the statically cached channels when it powers up. For instance, the rapid channel change device 203 can send an Internet Group Multicast Protocol (IGMP) Join packet to the distribution switch/router system 204 to acquire data associated with each static channel. When a dynamic channel is requested for the first time by a set-top box device 206, the rapid channel change device 203 can send a proxy IGMP Join packet associated with the requested channel to the distribution switch/router system 204 and create a cache for the channel after the data of the channel arrives from the distribution switch/router system 204. When there are no set-top box devices 206 receiving data associated with the dynamic channel, its cache can be deleted at the rapid channel change device 203.

In an illustrative embodiment, data associated with each IPTV channel can be cached via a separately addressed FIFO memory portion (a "caching FIFO") at the rapid channel change device 203. Each caching FIFO can be sized to accommodate a configurable amount of data packets. For instance, the amount of data packets can be configured to account for the buffering requirements of the RAP packets. Each time an IPTV multicast packet is received at the rapid channel change device 203, an additional copy of the packet is created for channel caching. In a particular embodiment, the rapid channel change device 203 can generate a caching FIFO address based on the multicast group IP address in the destination IP address header of the packet. The generated FIFO address can be used to determine which caching FIFO at the rapid channel change device 203 stores data associated with the channel corresponding to the received packet. The packet can then be cached at the identified caching FIFO.

To change a channel, a set-top box device 206 sends an IGMP Join packet to the access switch/router system 202. The IGMP Join includes the multicast group IP address for the requested IPTV channel. When the access switch/router system 202 receives the IGMP Join packet, the access switch/router system 202 extracts the multicast group IP address and determines which channel the set-top box device 206 is requesting. Further, the access switch/router system 202 determines whether a caching FIFO corresponding to the requested channel exists at the rapid channel change device 203. For instance, the access switch/router system 202 can generate a FIFO address based on the multicast group IP address and determine whether a caching FIFO exists at the rapid channel change device 203 that corresponds to the generated address. In an alternative embodiment, the rapid channel change device 203 can receive the IGMP Join packet from the access switch/router system 202 and determine whether a caching FIFO exists for the requested channel at the rapid channel change device 203.

If a caching FIFO corresponding to the channel exists at the rapid channel change device 203, the rapid channel change device 203 sends copies of the data packets stored at the caching FIFO, from the first RAP packet to the end of the FIFO, to the access switch/router system 202. The access switch/router system 202 sends the copies to the set-top box device 206 as fast as the bandwidth of the IPTV access network 208 allows (i.e., without impacting video transmission to other set-top box devices). After sending the cached data for the requested channel, the set-top box device 206 is connected to the A-server multicast stream of the requested channel via the access switch/router system 202, the rapid channel change device 203, or any combination thereof.

On the other hand, if the rapid channel change device 203 does not currently cache data associated with a channel requested by a set-top box device 206, the rapid channel change device 203 can generate a proxy IGMP Join and forward the proxy IGMP Join request to the distribution switch/router system 204. In response to the proxy IGMP Join request, the distribution switch/router system 204 sends the cached data packets of the requested channel to the access switch/router system 202. In a particular embodiment, the distribution switch/router system 204 can use a maximum available bandwidth to send packets to the access switch/router system 202, such that channel change delay can be minimized. After the packets cached for a requested channel are sent from the distribution switch/router system 204 to the rapid channel change device 203, the distribution switch/router system 204 can connect the rapid channel change device 203 to the A-server multicast stream for the requested channel.

When data packets of the requested channel arrive from the distribution switch/router system 204, the rapid channel change device 203 creates a caching FIFO for the channel and caches the packets in the created FIFO with a RAP packet at the beginning. The rapid channel change device 203 reads out copies of the cached packets to the access switch/router system 202, which sends the copies (or additional copies made at the access switch/router system 202) to the set-top box device 206 requesting the channel. After the cached packets are sent from the access switch/router system 202 to the set-top box device 206, the access switch/router system 202 stops sending packets the set-top box device 206 can be joined to the A-server multicast stream.

Figure 3:
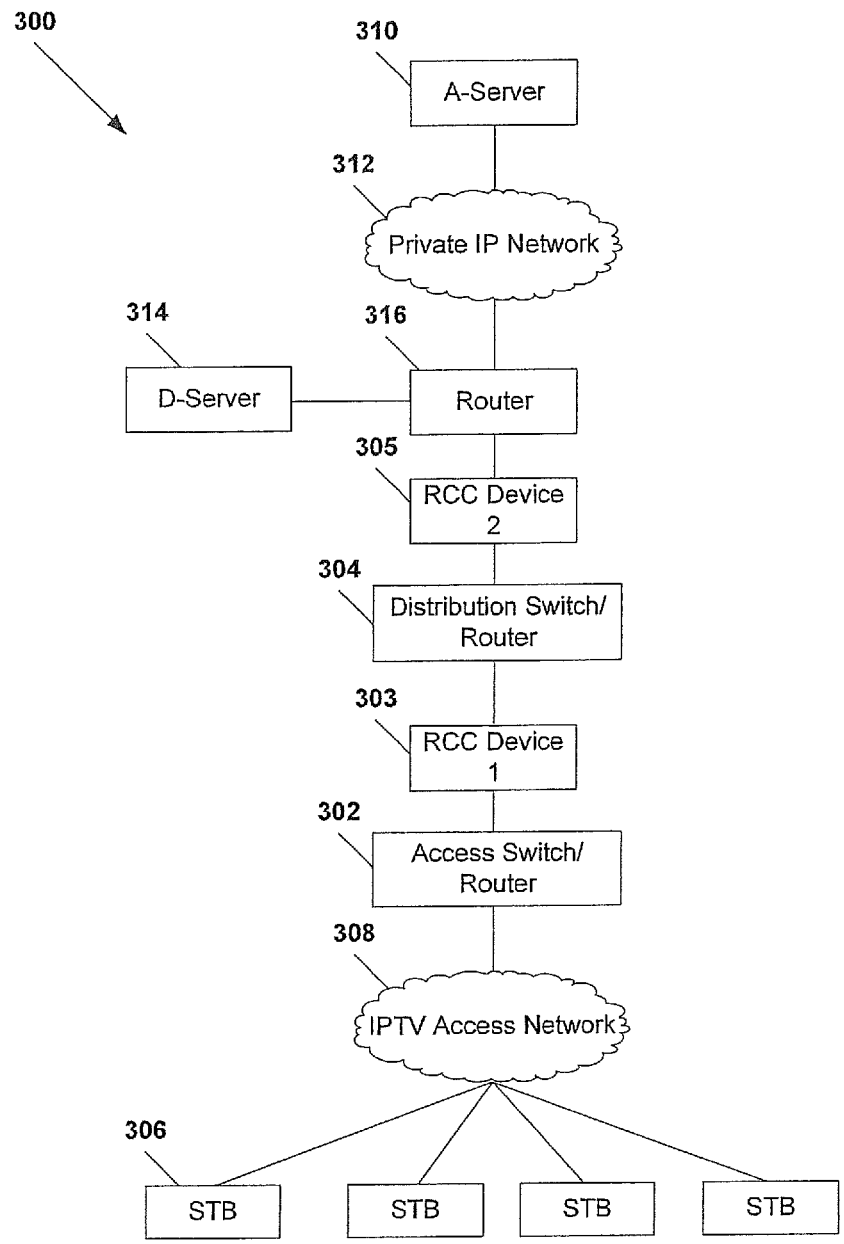
FIG. 3 is a block diagram of a third particular embodiment of a system to deliver video content.

Referring to FIG. 3, a third particular embodiment of a system to deliver video content is illustrated and designated generally 300. The system 300 includes an access switch/router system 302 of an Internet Protocol Television (IPTV) network. The access switch/router system 302 can include one or more servers, one or more routers, one or more switches, or any combination thereof. In one embodiment, the access switch/router system 302 can be included at a digital subscriber line access multiplexer (DSLAM). The access switch/router system 302 communicates with a first rapid channel change device 303, which communicates with a distribution switch/router system 304. In an illustrative embodiment, the distribution switch/router system 304 may be located at a central office facility of the IPTV network. The distribution switch/router system 304 can include one or more servers, one or more routers, one or more switches, or any combination thereof. Further, the access switch/router system 302 communicates with a plurality of set-top box devices 306 via an IPTV access network 308.

The distribution switch/router system 304 communicates with a second rapid channel change device 305 that communicates with one or more video content acquisition servers, such as the A-server 310, via a private IP network 312. In an illustrative embodiment, the second rapid channel change device 305 can communicate with the private IP network 312 via a router 316. The router 316 can communicate with a designated server, such as the D-server 314, that handles packet loss events or provides other functions of the IPTV network.

The second rapid channel change device 305 caches recent data associated with channels received from A-servers, such as the A-server 310. For example, the second rapid channel change device 305 can cache data associated with the channels available from a service provider to the set-top box devices 306. The second rapid channel change device 305 creates a caching memory to store data associated with each channel. For instance, when the second rapid channel change device 305 is powered up, it can create a caching first-in first-out (FIFO) memory for each channel, in which packets stored first are read out first. The packets can be encapsulated with a multicast group IP address of a channel as the destination IP address and an IP address of the A-Server 310 as the source IP address. The second rapid channel change device 305 can send cached data for a channel to the access switch/router system 302, via the distribution switch/router system 304, in response to a request received at the distribution switch/router system 304 from the access switch/router system 302. Once the cached data for the channel is sent to the access switch/router system 302, the distribution switch/router system 304, second rapid channel change device 305, or any combination thereof, can connect the access switch/router system 302 with a multicast stream sent by the A-server 310 for the requested channel.

The first rapid channel change device 303 caches data packets associated with those channels viewed via the set-top box devices 306. This can include fewer channels than the channels cached at the second rapid channel change device 305. In a particular embodiment, the first rapid channel change device 303 can store data associated with channels that are statically cached at the first rapid channel change device 303 whether or not any subscribers are watching the channels. Statically cached channels can be selected based on their popularity, such as local channels, news channels, sports channels, or other channels. The first rapid channel change device 303 can dynamically store data for one or more channels that are not statically cached, when one or more of the set-top box devices 306 are tuned to such channels. Statically cached channels are sometimes referred to herein as "static channels." Dynamically cached channels are sometimes referred to herein as "dynamic channels."

The first rapid channel change device 303 can acquire data associated with the statically cached channels when it powers up. For instance, the first rapid channel change device 303 can send an Internet Group Multicast Protocol (IGMP) Join packet to the distribution switch/router system 304 to acquire data associated with each static channel. When a dynamic channel is requested for the first time by a set-top box device 306, the first rapid channel change device 303 can send a proxy IGMP Join packet associated with the requested channel to the distribution switch/router system 304 and create a cache for the channel after the data of the channel arrives from the distribution switch/router system 304. When there are no set-top box devices 306 receiving data associated with the dynamic channel, its cache can be deleted at the first rapid channel change device 303.

In an illustrative embodiment, data associated with each IPTV channel can be cached via a separately addressed FIFO memory portion (a "caching FIFO") at the first rapid channel change device 303. Each caching FIFO can be sized to accommodate a configurable amount of data packets. For instance, the amount of data packets can be configured to account for the buffering requirements of the RAP packets. Each time an IPTV multicast packet is received at the first rapid channel change device 303, an additional copy of the packet is created for channel caching. In a particular embodiment, the first rapid channel change device 303 can generate a caching FIFO address based on the multicast group IP address in the destination JP address header of the packet. The generated FIFO address can be used to determine which caching FIFO at the first rapid channel change device 303 stores data associated with the channel corresponding to the received packet. The packet can then be cached at the identified caching FIFO.

To change a channel, a set-top box device 306 sends an IGMP Join packet to the access switch/router system 302. The IGMP Join includes the multicast group IP address for the requested IPTV channel. When the access switch/router system 302 receives the IGMP Join packet, the access switch/router system 302 extracts the multicast group IP address and determines which channel the set-top box device 306 is requesting. Further, the access switch/router system 302 determines whether a caching FIFO corresponding to the requested channel exists at the first rapid channel change device 303. For instance, the access switch/router system 302 can generate a FIFO address based on the multicast group IP address and determine whether a caching FIFO exists at the first rapid channel change device 303 that corresponds to the generated address. In an alternative embodiment, the first rapid channel change device 303 can receive the IGMP Join packet from the access switch/router system 302 and determine whether a caching FIFO exists for the requested channel at the first rapid channel change device 303.

If a caching FIFO corresponding to the channel exists at the first rapid channel change device 303, the first rapid channel change device 303 sends copies of the data packets stored at the caching FIFO, from the first RAP packet to the end of the FIFO, to the access switch/router system 302. The access switch/router system 302 sends the copies to the set-top box device 306 as fast as the bandwidth of the IPTV access network 308 allows (i.e., without impacting video transmission to other set-top box devices). After sending the cached data for the requested channel, the set-top box device 306 is connected to the A-server multicast stream of the requested channel via the access switch/router system 302, the first rapid channel change device 303, or any combination thereof.

On the other hand, if the first rapid channel change device 303 does not currently cache data associated with a channel requested by a set-top box device 306, the first rapid channel change device 303 can generate a proxy IGMP Join and forward the proxy IGMP Join request to the distribution switch/router system 304. In response to the proxy IGMP Join request, the distribution switch/router system 304 can obtain copies of the cached data packets of the requested channel from the second rapid channel change device 305 and send the copies (or additional copies made at the distribution switch/router system 304) to the access switch/router system 302. In a particular embodiment, the distribution switch/router system 304 can use a maximum available bandwidth to send packets to the access switch/router system 302, such that channel change delay can be minimized. After the packets cached for a requested channel are sent from the distribution switch/router system 304 to the first rapid channel change device 303, the access switch/router system 302 can be connected to the A-server multicast stream for the requested channel.

When data packets of the requested channel arrive from the distribution switch/router system 304, the first rapid channel change device 303 creates a caching FIFO for the channel and caches the packets in the created FIFO with a RAP packet at the beginning. The first rapid channel change device 303 reads out copies of the cached packets to the access switch/router system 302, which sends the copies (or additional copies made at the access switch/router system 302) to the set-top box device 306 requesting the channel. After the cached packets are sent from the access switch/router system 302 to the set-top box device 306, the access switch/router system 302 stops sending packets the set-top box device 306 can be joined to the A-server multicast stream.

Figure 4:
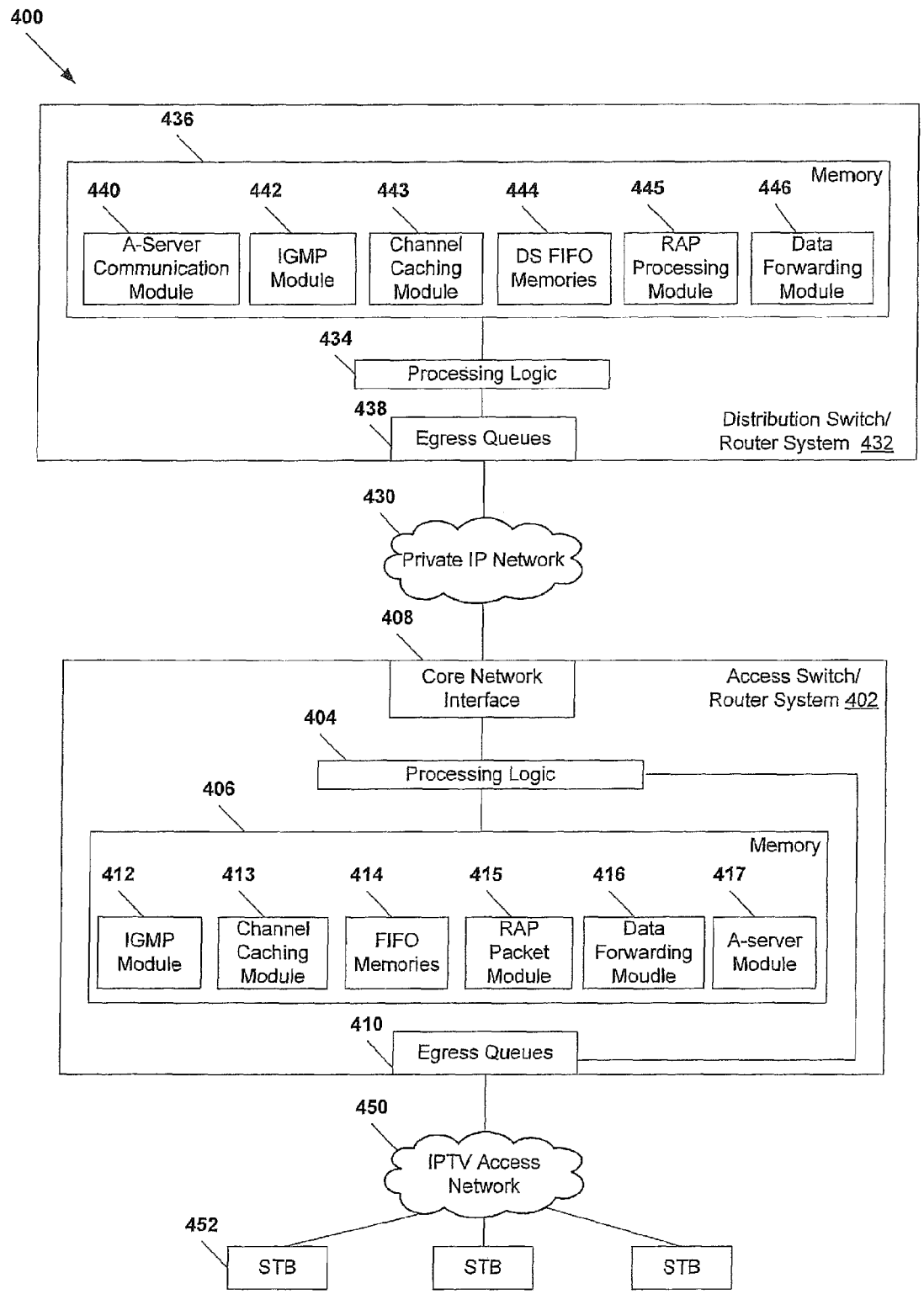
FIG. 4 is a block diagram of a fourth particular embodiment of a system to deliver video content.

Referring to FIG. 4, a fourth particular embodiment of a system to deliver video content is illustrated and designated generally 400. The system 400 includes an access switch/router system 402 communicating with a distribution switch/router system 432 via a private Internet Protocol (IP) network 430. The access switch/router system 402 also communicates with a plurality of set-top box devices 452 via an Internet Protocol Television (IPTV) access network 450. The access switch/router system 402 includes processing logic 404 and memory 406 accessible to the processing logic 404. In addition, the access switch/router system 402 includes a core network interface 408 to facilitate communication between the access switch/router system 402 and the private IP network 430. Further, the access switch/router system 402 includes a plurality of egress queues 410 that are adapted to communicate video data packets to the plurality of set-top box devices 452 on a per subscriber basis.

As illustrated in FIG. 4, the memory 406 includes a plurality of modules 412-417 that are adapted to provide various functions of the access switch/router system 402. In one embodiment, the modules can include instructions executable by the processing logic 404. Such instructions can be embodied in one or more programs, operating systems, or any combination thereof, adapted to run at the access switch/router system 402. In an alternative embodiment, one or more of the functions provided by the modules 412-417 may be implemented using hardware logic, software instructions, or any combination thereof.

The memory 406 can include, for example, an Internet Group Multicast Protocol (IGMP) module 412 that is executable by the processing logic 404 to send IGMP Join requests for each static channel maintained by the access switch/router system 402 to the distribution switch/router system 432 when the access switch/router system 402 powers up. In addition, the IGMP module 412 is executable by the processing logic 404 to send proxy IGMP Join requests corresponding to dynamic channels to the distribution switch/router system 432 on behalf of set-top box devices 452 requesting such channels. The IGMP module 412 is executable by the processing logic 404 to receive data packets associated with each channel from the distribution switch/router system 432.

The memory 406 includes a channel caching module 413 that is executable by the processing logic 404 to cache data packets associated with each channel at one of a plurality of AS first-in first-out (FIFO) memories 414 maintained at the access switch/router system 402, where each of the AS FIFO memories 414 is associated with a particular channel. For a dynamic channel, the channel caching module 413 can be executable by the processing logic 404 to create an AS FIFO memory 414 corresponding to the dynamic channel after receiving data packets corresponding to the channel from the distribution switch/router system 432. When a packet is stored in an AS FIFO memory 414, the source and destination IP addresses and the quality of service (QoS) marking of the packet can remain unchanged, while the time-to-live field and checksum of the IP header can be modified.

Each of the AS FIFO memories 414 stores data packets that include random access point (RAP) packets and other data packets. An IPTV decoder at a set-top box device 452 uses a Random Access Point (RAP) as the starting frame to decode a stream of IPTV data. A RAP packet includes an I-frame combined with control data, such as a Moving Picture Experts Group (MPEG) program association table (PAT), program map table (PMT), or any combination thereof. A RAP packet can be uniquely marked via a real-time transport protocol (RTP) header extension having a signature that is detectable by the access switch/router system 402. For instance, the signature can include a particular pattern in the leftmost four bits of the first 32-bit word of the user datagram protocol (UDP) payload of the RAP packet.

Each RAP packet in an AS FIFO memory 414 is associated with a RAP marker. For instance, the first packet in the AS FIFO memory 414 is always a RAP packet, denoted as $RAP_1$. The other RAP packets in the FIFO can be denoted as $RAP_2, \ldots RAP_k$. Between two RAP packets are other data packets arranged according the order of their arrivals. Further, each RAP packet in an AS FIFO memory 414 is associated with a RAP timer. When the RAP timer becomes equal to a definable parameter, ("$RAP_{delay}$"), the next previous RAP packet can be aged out, such that the FIFO_Head_Pointer is moved to point to the RAP packet whose timer has become equal to the $RAP_{delay}$. For instance, RAP packets can arrive at the access switch/router system 402 in intervals of 0.5 seconds. $RAP_{delay}$ can be set at 1.2 seconds, such that when the $RAP_2$ timer equals 1.2 seconds, the $RAP_1$ packet is considered aged out, and the FIFO_Head_pointer can move to point to $RAP_2$. At this point, the $RAP_3$ equals approximately 0.7 seconds (i.e., 0.5 seconds less than the $RAP_2$ timer). When the $RAP_3$ timer equals 1.2 seconds, the FIFO_Head_pointer can move to point to $RAP_3$, and so on.

For each FIFO memory 414, a FIFO_Head_pointer points to a first packet in the AS FIFO memory 414, and a FIFO_Tail_pointer points to the last packet in the AS FIFO memory 414. The FIFO_Head_pointer serves as the starting point for each FIFO reading process. The FIFO_Tail_pointer is used when new packets are added to the AS FIFO memory 414. The FIFO_Tail_pointer is also used to decide whether the data in the AS FIFO memory 414 has been sent to a set-top box device 452. Each time the access switch/router system 402 starts to send packets from the AS FIFO memory 414 to a set-top box device 452, the AS FIFO memory 414 creates a read_pointer that is initialized at the FIFO_Head_pointer. After each packet in the AS FIFO memory 414 is sent, the read_pointer moves to the next packet in the AS FIFO memory 414. After the read_pointer points to the FIFO_Tail_pointer, the packets in the AS FIFO memory 414 have been sent to a set-top box device 452, and the reading process from the caching is completed. The read_pointer is then released.

In an illustrative, non-limiting embodiment, the access switch/router system 402 can allow multiple set-top box devices 452 to access the same FIFO memory 414, such that the set-top box devices 452 can receive video data associated with the same channel. In this embodiment, multiple read_pointers are created for the AS FIFO memory 414, wherein each read_pointer corresponds to one of the set-top box devices. The read_pointers can move at different paces and need not all point to the same packet in the AS FIFO memory 414, to accommodate different starting times and bandwidths associated with each set-top box device 452.

Each time an IPTV multicast packet is received at the access switch/router system 402 from the distribution switch/router system 432, the channel caching module 413 can be executable by the processing logic 404 to create an additional copy of the packet for channel caching. In a particular embodiment, the channel caching module 413 can be executable by the processing logic 404 to generate a caching FIFO address based on the multicast group IP address in the destination IP address header of the packet. The generated FIFO address can be used to determine whether a caching FIFO memory exists at the access switch/router system 402 for the channel associated with the received packet. In addition, the channel caching module 413 can be executable by the processing logic 404 to detect whether the packet is a random access point (RAP) packet.

If a caching FIFO memory 414 exists at the access switch/router system 402 for the channel associated with the received packet, the channel caching module 413 is executable by the processing logic 404 to add the packet to the end of the identified FIFO memory 414. If the packet is a RAP packet, the RAP packet module 415 can be executable by the processing logic 404 to assign the RAP packet a RAP marker and to start a timer associated with the RAP packet. If no FIFO memory is maintained at the at the access switch/router system 402 for the channel corresponding to a received packet, then the channel caching module 413 is executable by the processing logic 404 to create a new FIFO memory. If the packet is a RAP packet, it is assigned a marker and put into the new FIFO memory with both the FIFO_Head_Pointer and FIFO_Tail_Pointer pointing to the RAP packet. If the packet is not a RAP packet, it is discarded.

The memory 406 includes an A-server module 417 that is executable by the processing logic 404 to connect with an A-server multicast stream of each cached channel. In a particular embodiment, the distribution server 432 can connect the access switch/router system 402 with each such multicast stream.

In a particular embodiment, the IGMP module 412 is also executable by the processing logic 404 to receive an IGMP Join request from a set-top box device 452. The IGMP Join request indicates the multicast group IP address for an IPTV channel selected at the set-top box device 452. The IGMP module 412 is executable by the processing logic 404 to extract the multicast group IP address and identify the channel selected at the set-top box device 452. Further, the IGMP module 412 is executable by the processing logic 404 to generate a FIFO address based on the multicast group IP address and to determine whether a FIFO memory that corresponds to the generated address exists within the plurality of AS FIFO memories 414 maintained at the access switch/router system 402.

The memory 406 includes a data forwarding module 416 that is executable by the processing logic 404 to send cached data to a set-top box device 452 in response to an IGMP Join request, beginning with a $RAP_1$ packet containing an I-frame. For instance, if the access switch/router system 402 maintains an AS FIFO memory 414 associated with a selected channel indicated by an IGMP Join request, the data stored at the AS FIFO memory 414 is sent to the requesting set-top box device 452 via one of the plurality of per-subscriber egress queues 410. If a FIFO memory is not maintained at the access switch/router system 402 for the channel requested by the set-top box device 406, the channel caching module 413 can be executable by the processing logic 404 to create a FIFO memory for the channel and to cache data packets for the channel in the created FIFO memory. Such data packets can be received from the distribution switch/router system 432 in response to an IGMP Join request that is sent by the access switch/router system 402 to the distribution switch/router system 432 after the access switch/router system 402 has received an IGMP Join request indicating the channel from the set-top box device 452. The data forwarding module 416 is executable by the processing logic 404 to send such data packets to the requesting set-top box device 452 via one of the egress queues 410.

In an illustrative embodiment, when the access switch/router system 402 reads packets out of an AS FIFO memory 414 to a set-top box device 452, the data forwarding module 416 can be executable by the processing logic 404 to place copies of the packets into one of the egress queues 410 communicating with the set-top box device 452 via the IPTV access network 450. Further, the data forwarding module 416 can be executable by the processing logic 404 to count the packets that have been sent through the AS FIFO memory 414 to the set-top box device 452. The A-server module 417 is executable by the processing logic 404 to connect the set-top box device 452 to the A-Server multicast stream for the requested channel and to stop the sending process from the AS FIFO memory 414 when the packets in the AS FIFO memory 414 have been sent, and the amount of packets sent through the AS FIFO memory 414 is no less than a configurable amount, such as an amount that occupies a time equal to $RAP_{delay}$.

In another embodiment, the data forwarding module 416 can be executable by the processing logic 404 to stop sending packets to the set-top box device 452 in response to an IGMP Leave packet issued by the set-top box device 452 when the set-top box device 452 has connected with the A-server multicast stream. If the set-top box device 452 is the last to receive data for the channel, and the channel is a dynamic channel, the channel caching module 413 can be executable by the processing logic 404 to delete the corresponding FIFO memory 414.

In an illustrative, non-limiting embodiment, the access switch/router system 402 can dynamically adjust its sending rate according to the available bandwidth from the access network via the back-pressure flow control scheme from each egress queue 410 to the AS FIFO memory 414. When an egress queue 410 becomes full, or when a configurable "high water mark" is crossed, a back-pressure signal can be asserted, and the data forwarding module 416 can be executable by the processing logic 404 to stop sending packets to the egress queue 410. The data forwarding module 416 can be executable by the processing logic 404 to resume sending packets after the back-pressure signal is cleared. Because each set-top box device 452 is served by a different egress queue 410, a back-pressure signal sent from one egress queue 410 does not affect the speed at which other set-top box devices 452 receive packets from the same, or another, FIFO memory 414.

In a particular embodiment, the distribution switch/router system 432 includes processing logic 434 and memory 436 accessible to the processing logic 434. Further, the distribution switch/router system 432 includes a second plurality of egress queues 438 that communicate with access switches, such as the access switch/router system 402, via the private IP network 430. The memory 436 includes a plurality of modules 440-246 that are adapted to provide various functions of the distribution switch/router system 432. In one embodiment, the modules 440-446 can include instructions executable by the processing logic 434. Such instructions can be embodied in one or more programs, operating systems, databases, or any combination thereof, adapted to run at the distribution switch/router system 432. In an alternative embodiment, one or more of the functions provided by the modules 440-446 can be implemented using hardware logic, software instructions, or any combination thereof.

The memory 436 can include an A-server communication module 440 that is executable by the processing logic 434 to receive video data packets associated with a plurality of IPTV channels offered to the set-top box devices 452 from one or more A-servers (not shown). The memory 436 can include a channel caching module 443 that is executable by the processing logic 434 to cache video data received from the A-servers at a plurality of DS FIFO memories 444. Each of the DS FIFO memories 444 is associated with a particular channel. The memory 436 can also include a RAP processing module 445 that is executable by the processing logic 434 to obtain RAP data and to assign RAP markers and to start timers associated with RAP packets stored at the DS FIFO memories 444.

The memory 436 includes a data forwarding module 446 executable by the processing logic 434 to send video data corresponding to requested channels to the access switch/router system 402. For instance, in response to an IGMP Join request received from the access switch/router system 402, the distribution switch/router system 432 sends the cached data packets associated with the requested channel to the access switch/router system 402 via one of the second egress queues 438. In a particular embodiment, the distribution switch/router system 432 can use a maximum available bandwidth to send packets to the access switch/router system 402, such that channel change delay can be minimized. After the cached data associated with the requested channel is sent to the access switch/router system 402, the A-server communication module 440 can be executable by the processing logic 434 to connect the access switch/router system 402 with an A-server multicast stream corresponding to the channel.

Figure 5:
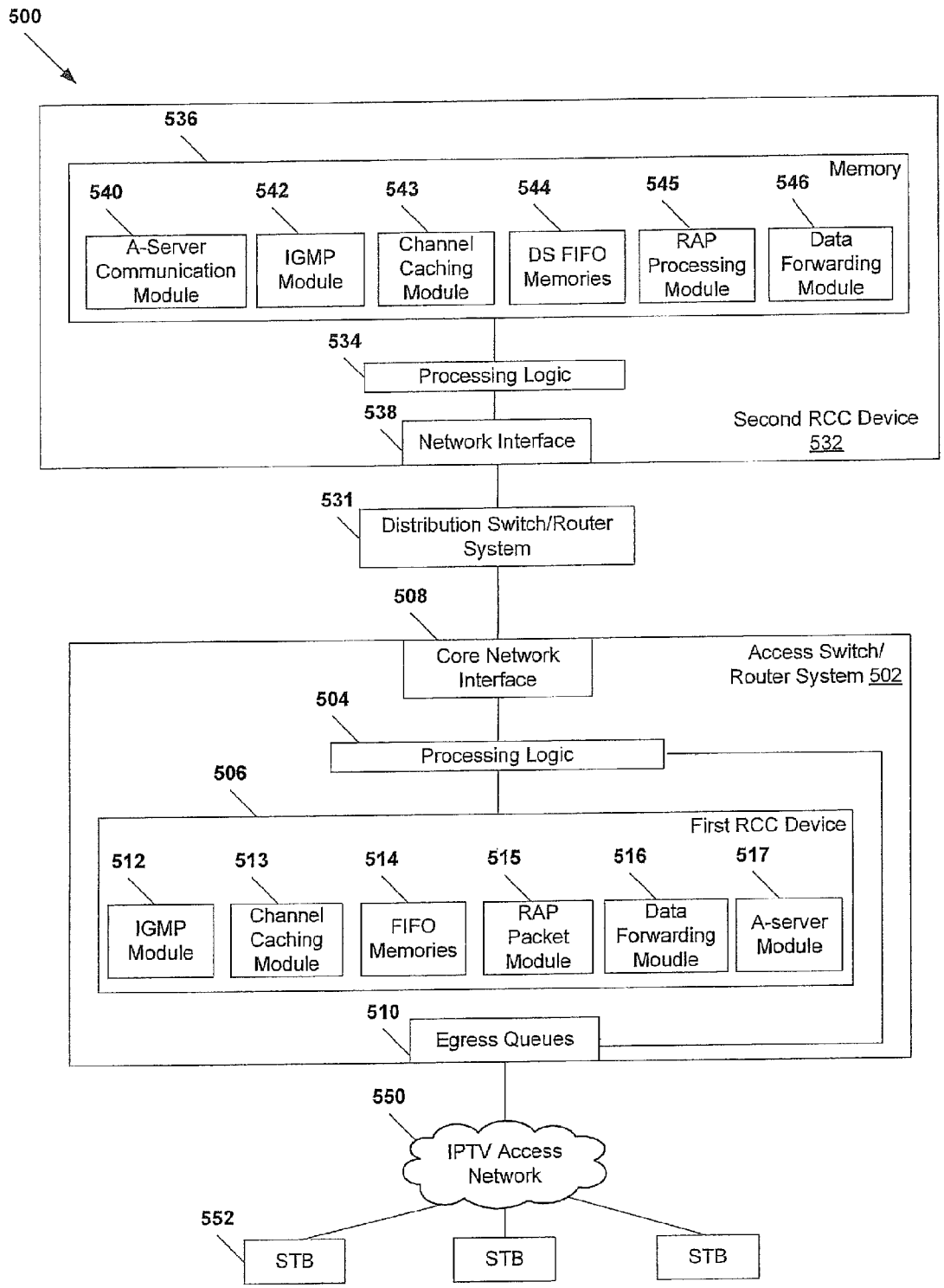
FIG. 5 is a block diagram of a fifth particular embodiment of a system to deliver video content.

Referring to FIG. 5, a fifth particular embodiment of a system to deliver video content is illustrated and designated generally 500. The system 500 includes an access switch/router system 502 communicating with a distribution switch/router system 531. The distribution switch/router system 531 communicates with a second rapid channel change device 532. The second rapid channel change device 532 can be a network entity coupled to or communicating with the distribution switch/router system 531. The access switch/router system 502 also communicates with a plurality of set-top box devices 552 via an Internet Protocol Television (IPTV) access network 550.

The access switch/router system 502 includes processing logic 504 and a first rapid channel change device 506 accessible to the processing logic 504. The first rapid channel change device 506 can be an expansion card received at an interface of the access switch/router system 502. In addition, the access switch/router system 502 includes a network interface 508 to facilitate communication between the access switch/router system 502 and the distribution switch/router system 531. Further, the access switch/router system 502 includes a plurality of egress queues 510 that are adapted to communicate video data packets to the plurality of set-top box devices 552 on a per subscriber basis.

As illustrated in FIG. 5, the first rapid channel change device 506 includes a plurality of modules 512-517 that are adapted to provide various functions at the access switch/router system 502. In one embodiment, the modules can include instructions executable by the processing logic 504. Such instructions can be embodied in one or more programs, operating systems, or any combination thereof, adapted to run at the access switch/router system 502. In an alternative embodiment, one or more of the functions provided by the modules 512-517 may be implemented using hardware logic, software instructions, or any combination thereof.

The first rapid channel change device 506 can include, for example, an Internet Group Multicast Protocol (IGMP) module 512 that is executable by the processing logic 504 to send IGMP Join requests for each static channel maintained by the access switch/router system 502 to the distribution switch/router system 531 when the access switch/router system 502 powers up. In addition, the IGMP module 512 is executable by the processing logic 504 to send proxy IGMP Join requests corresponding to dynamic channels to the distribution switch/router system 531 on behalf of set-top box devices 552 requesting such channels. The IGMP module 512 is executable by the processing logic 504 to receive data packets associated with each channel from the distribution switch/router system 531.

The first rapid channel change device 506 includes a channel caching module 513 that is executable by the processing logic 504 to cache data packets associated with each channel at one of a plurality of AS first-in first-out (FIFO) memories 514 maintained at the access switch/router system 502, where each of the AS FIFO memories 514 is associated with a particular channel. For a dynamic channel, the channel caching module 513 can be executable by the processing logic 504 to create an AS FIFO memory 514 corresponding to the dynamic channel after receiving data packets corresponding to the channel from the distribution switch/router system 531. When a packet is stored in an AS FIFO memory 514, the source and destination IP addresses and the quality of service (QoS) marking of the packet can remain unchanged, while the time-to-live field and checksum of the IP header can be modified.

Each of the AS FIFO memories 514 stores data packets that include random access point (RAP) packets and other data packets. An IPTV decoder at a set-top box device 552 uses a Random Access Point (RAP) as the starting frame to decode a stream of IPTV data. A RAP packet includes an I-frame combined with control data, such as a Moving Picture Experts Group (MPEG) program association table (PAT), program map table (PMT), or any combination thereof. A RAP packet can be uniquely marked via a real-time transport protocol (RTP) header extension having a signature that is detectable by the access switch/router system 502. For instance, the signature can include a particular pattern in the leftmost four bits of the first 32-bit word of the user datagram protocol (UDP) payload of the RAP packet.

Each RAP packet in an AS FIFO memory 514 is associated with a RAP marker. For instance, the first packet in the AS FIFO memory 514 is always a RAP packet, denoted as $RAP_1$. The other RAP packets in the FIFO can be denoted as $RAP_2, \ldots RAP_k$. Between two RAP packets are other data packets arranged according the order of their arrivals. Further, each RAP packet in an AS FIFO memory 514 is associated with a RAP timer. When the RAP timer becomes equal to a definable parameter, ("$RAP_{delay}$"), the next previous RAP packet can be aged out, such that the FIFO_Head_Pointer is moved to point to the RAP packet whose timer has become equal to the $RAP_{delay}$. For instance, RAP packets can arrive at the access switch/router system 502 in intervals of 0.5 seconds. $RAP_{delay}$ can be set at 1.2 seconds, such that when the $RAP_2$ timer equals 1.2 seconds, the $RAP_1$ packet is considered aged out, and the FIFO_Head_ pointer can move to point to $RAP_2$. At this point, the $RAP_3$ equals approximately 0.7 seconds (i.e., 0.5 seconds less than the $RAP_2$ timer). When the $RAP_3$ timer equals 1.2 seconds, the FIFO_Head_pointer can move to point to $RAP_3$, and so on.

For each FIFO memory 514, a FIFO_Head_pointer points to a first packet in the AS FIFO memory 514, and a FIFO_Tail_pointer points to the last packet in the AS FIFO memory 514. The FIFO_Head_pointer serves as the starting point for each FIFO reading process. The FIFO_Tail_pointer is used when new packets are added to the AS FIFO memory 514. The FIFO_Tail_pointer is also used to decide whether the data in the AS FIFO memory 514 has been sent to a set-top box device 552. Each time the access switch/router system 502 starts to send packets from the AS FIFO memory 514 to a set-top box device 552, the AS FIFO memory 514 creates a read_pointer that is initialized at the FIFO_Head_pointer. After each packet in the AS FIFO memory 514 is sent, the read_pointer moves to the next packet in the AS FIFO memory 514. After the read_pointer points to the FIFO_Tail_pointer, the packets in the AS FIFO memory 514 have been sent to a set-top box device 552, and the reading process from the caching is completed. The read_pointer is then released.

In an illustrative, non-limiting embodiment, the access switch/router system 502 can allow multiple set-top box devices 552 to access the same FIFO memory 514, such that the set-top box devices 552 can receive video data associated with the same channel. In this embodiment, multiple read_pointers are created for the AS FIFO memory 514, wherein each read_pointer corresponds to one of the set-top box devices. The read_pointers can move at different paces and need not all point to the same packet in the AS FIFO memory 514, to accommodate different starting times and bandwidths associated with each set-top box device 552.

Each time an IPTV multicast packet is received at the access switch/router system 502 from the distribution switch/router system 531, the channel caching module 513 can be executable by the processing logic 504 to create an additional copy of the packet for channel caching. In a particular embodiment, the channel caching module 513 can be executable by the processing logic 504 to generate a caching FIFO address based on the multicast group IP address in the destination IP address header of the packet. The generated FIFO address can be used to determine whether a caching FIFO memory exists at the access switch/router system 502 for the channel associated with the received packet. In addition, the channel caching module 513 can be executable by the processing logic 504 to detect whether the packet is a random access point (RAP) packet.

If a caching FIFO memory 514 exists at the access switch/router system 502 for the channel associated with the received packet, the channel caching module 513 is executable by the processing logic 504 to add the packet to the end of the identified FIFO memory 514. If the packet is a RAP packet, the RAP packet module 515 can be executable by the processing logic 504 to assign the RAP packet a RAP marker and to start a timer associated with the RAP packet. If no FIFO memory is maintained at the at the access switch/router system 502 for the channel corresponding to a received packet, then the channel caching module 513 is executable by the processing logic 504 to create a new FIFO memory. If the packet is a RAP packet, it is assigned a marker and put into the new FIFO memory with both the FIFO_Head_Pointer and FIFO_Tail_Pointer pointing to the RAP packet. If the packet is not a RAP packet, it is discarded.

The first rapid channel change device 506 includes an A-server module 517 that is executable by the processing logic 504 to connect with an A-server multicast stream of each cached channel. In a particular embodiment, the distribution server 532 can connect the access switch/router system 502 with each such multicast stream.

In a particular embodiment, the IGMP module 512 is also executable by the processing logic 504 to receive an IGMP Join request from a set-top box device 552. The IGMP Join request indicates the multicast group IP address for an IPTV channel selected at the set-top box device 552. The IGMP module 512 is executable by the processing logic 504 to extract the multicast group IP address and identify the channel selected at the set-top box device 552. Further, the IGMP module 512 is executable by the processing logic 504 to generate a FIFO address based on the multicast group IP address and to determine whether a FIFO memory that corresponds to the generated address exists within the plurality of AS FIFO memories 514 maintained at the access switch/router system 502.

The first rapid channel change device 506 includes a data forwarding module 516 that is executable by the processing logic 504 to send cached data to a set-top box device 552 in response to an IGMP Join request, beginning with a $RAP_1$ packet containing an I-frame. For instance, if the access switch/router system 502 maintains an AS FIFO memory 514 associated with a selected channel indicated by an IGMP Join request, the data stored at the AS FIFO memory 514 is sent to the requesting set-top box device 552 via one of the plurality of per-subscriber egress queues 510. If a FIFO memory is not maintained at the access switch/router system 502 for the channel requested by the set-top box device 506, the channel caching module 513 can be executable by the processing logic 504 to create a FIFO memory for the channel and to cache data packets for the channel in the created FIFO memory. Such data packets can be received from the distribution switch/router system 531 in response to an IGMP Join request that is sent by the access switch/router system 502 to the distribution switch/router system 531 after the access switch/router system 502 has received an IGMP Join request indicating the channel from the set-top box device 552. The data forwarding module 516 is executable by the processing logic 504 to send such data packets to the requesting set-top box device 552 via one of the egress queues 510.

In an illustrative embodiment, when the access switch/router system 502 reads packets out of an AS FIFO memory 514 to a set-top box device 552, the data forwarding module 516 can be executable by the processing logic 504 to place copies of the packets into one of the egress queues 510 communicating with the set-top box device 552 via the IPTV access network 550. Further, the data forwarding module 516 can be executable by the processing logic 504 to count the packets that have been sent through the AS FIFO memory 514 to the set-top box device 552. The A-server module 517 is executable by the processing logic 504 to connect the set-top box device 552 to the A-Server multicast stream for the requested channel and to stop the sending process from the AS FIFO memory 514 when the packets in the AS FIFO memory 514 have been sent, and the amount of packets sent through the AS FIFO memory 514 is no less than a configurable amount, such as an amount that occupies a time equal to $RAP_{delay}$.

In another embodiment, the data forwarding module 516 can be executable by the processing logic 504 to stop sending packets to the set-top box device 552 in response to an IGMP Leave packet issued by the set-top box device 552 when the set-top box device 552 has connected with the A-server multicast stream. If the set-top box device 552 is the last to receive data for the channel, and the channel is a dynamic channel, the channel caching module 513 can be executable by the processing logic 504 to delete the corresponding FIFO memory 514.

In an illustrative, non-limiting embodiment, the access switch/router system 502 can dynamically adjust its sending rate according to the available bandwidth from the access network via the back-pressure flow control scheme from each egress queue 510 to the AS FIFO memory 514. When an egress queue 510 becomes full, or when a configurable "high water mark" is crossed, a back-pressure signal can be asserted, and the data forwarding module 516 can be executable by the processing logic 504 to stop sending packets to the egress queue 510. The data forwarding module 516 can be executable by the processing logic 504 to resume sending packets after the back-pressure signal is cleared. Because each set-top box device 552 is served by a different egress queue 510, a back-pressure signal sent from one egress queue 510 does not affect the speed at which other set-top box devices 552 receive packets from the same, or another, FIFO memory 514.

In a particular embodiment, the second rapid channel change device 532 includes processing logic 534 and memory 536 accessible to the processing logic 534. Further, the second rapid channel change device 532 includes a network interface 538 that communicates with the distribution switch/router system 531. The memory 536 includes a plurality of modules 540-546 that are adapted to provide various functions of the second rapid channel change device 532. In one embodiment, the modules 540-546 can include instructions executable by the processing logic 534. Such instructions can be embodied in one or more programs, operating systems, databases, or any combination thereof, adapted to run at the second rapid channel change device 532. In an alternative embodiment, one or more of the functions provided by the modules 540-546 can be implemented using hardware logic, software instructions, or any combination thereof.

The memory 536 can include an A-server communication module 540 that is executable by the processing logic 534 to receive video data packets associated with a plurality of IPTV channels available to the set-top box devices 552 from one or more A-servers (not shown). The memory 536 can include a channel caching module 543 that is executable by the processing logic 534 to cache video data received from the A-servers at a plurality of DS FIFO memories 544. Each of the DS FIFO memories 544 is associated with a particular channel. The memory 536 can also include a RAP processing module 545 that is executable by the processing logic 534 to obtain RAP data and to assign RAP markers and to start timers associated with RAP packets stored at the DS FIFO memories 544.

The memory 536 includes a data forwarding module 546 executable by the processing logic 534 to send video data corresponding to requested channels to the access switch/router system 502 via the distribution switch/router system 531. For instance, in response to an IGMP Join request received from the access switch/router system 502 at the distribution switch/router system 531, the distribution switch/router system 531 can obtain copies of the cached data packets associated with the requested channel from the second rapid channel change system 532. The distribution switch/router system 531 can send the copies, or additional copies, to the access switch/router system 502. In a particular embodiment, the distribution switch/router system 531 can use a maximum available bandwidth to send packets to the access switch/router system 502, such that channel change delay can be minimized. After the cached data associated with the requested channel is sent to the access switch/router system 502, the A-server communication module 540 can be executable by the processing logic 534 to connect the access switch/router system 502 with an A-server multicast stream corresponding to the channel via the distribution switch/router system 531.

Figure 6:
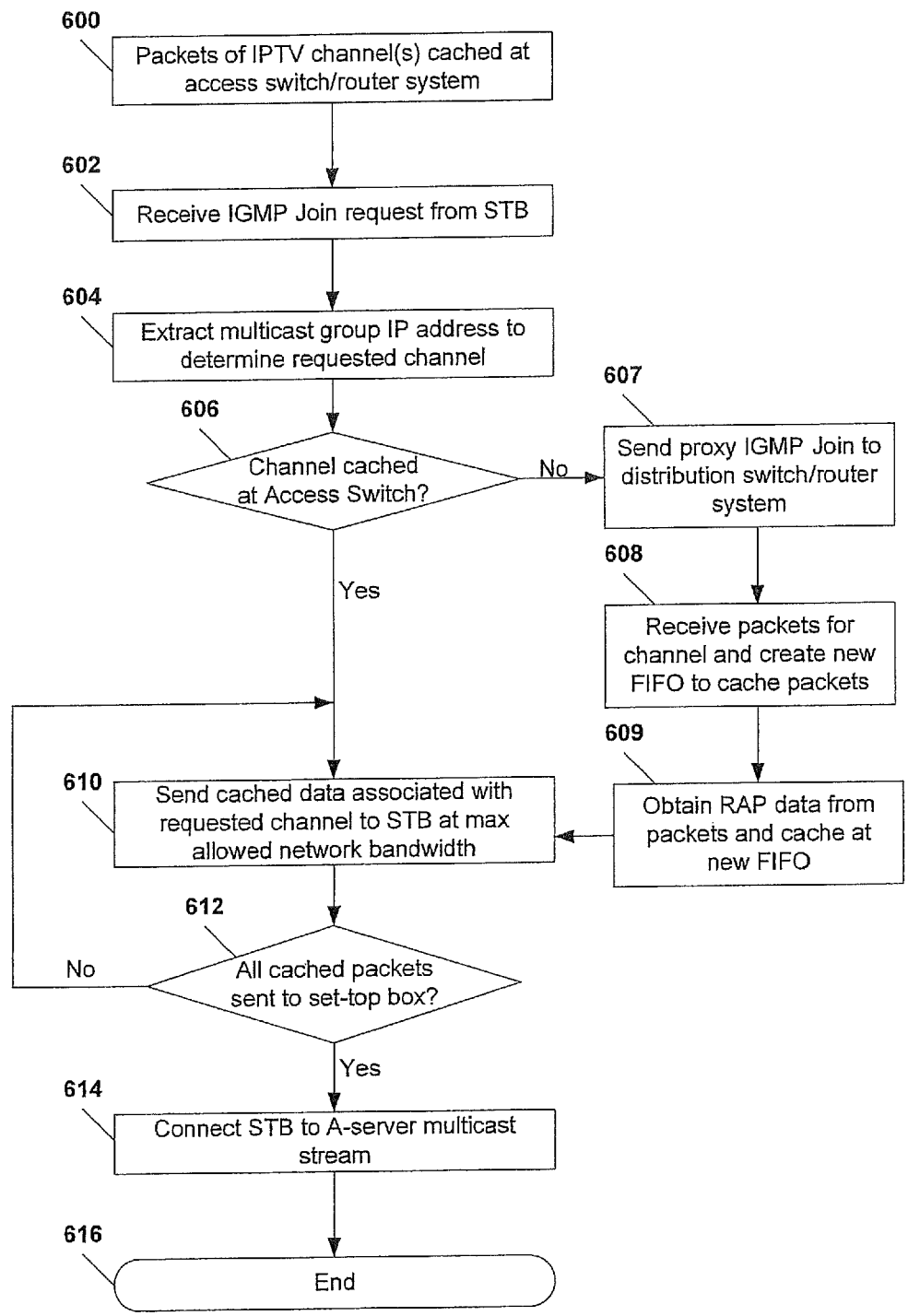
FIG. 6 is a flow diagram of a particular embodiment of a method of providing deliver video content.

Referring to FIG. 6, a particular embodiment of a method of delivering video content is illustrated. At block 600, an access switch/router system, such as an access switch/router system included at a digital subscriber line access multiplexer (DSLAM), caches data packets corresponding to one or more Internet Protocol Television (IPTV) channels. Moving to block 602, the access switch/router system receives an Internet Group Multicast Protocol (IGMP) Join request from a set-top box device. Proceeding to block 604, the access switch/router system extracts a multicast group IP address from the IGMP Join request to determine a requested channel.

Continuing to decision node 606, the access switch/router system determines whether data of the requested channel is cached at the access switch/router system. If the access switch/router system determines that data of the requested channel is cached at the access switch/router system, the method advances to block 610. Conversely, if the access switch/router system determines that data of the requested channel is not cached at the access switch/router system, the method moves to block 607. At block 607, the access switch/router system sends a proxy IGMP Join request for the requested channel to a distribution switch/router system. Moving to block 608, the access switch/router system receives packets for the requested channel and creates a new cache, such as a first-in first-out (FIFO) cache, to store the packets. Continuing to block 609, the access switch/router system obtains random access point (RAP) data for the requested channel for storage in the new cache. The method then proceeds to block 610.

Proceeding to block 610, the access switch/router system sends cached data associated with the requested channel to the requesting set-top box device. In an illustrative embodiment, the access switch/router system can send the cached data at a maximum allowed or maximum available network bandwidth. Continuing to decision node 612, the access switch/router system determines whether the cached packets for the requested channel have been sent to the set-top box device. If the packets have not been sent, the method can return to block 610. On the other hand, if the packets have been sent, the method advances to block 614, and the access switch/router system stops sending data from the caching FIFO and connects the set-top box device with a multicast stream of a video acquisition server (A-server) associated with the requested channel. The method terminates at 616.

Figure 7:
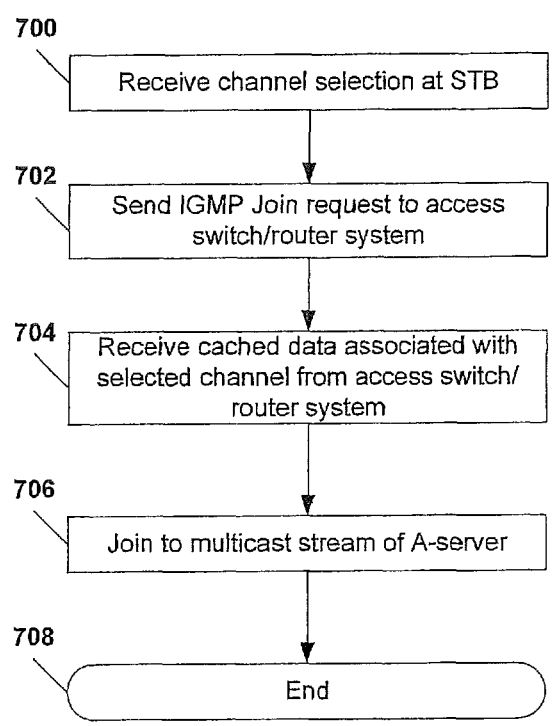
FIG. 7 is a flow diagram of a second particular embodiment of a method of delivering video content.

Referring to FIG. 7, a second particular embodiment of a method of delivering video content is illustrated. At block 700, a channel selection is received at a set-top box device. Moving to block 702, the set-top box device sends an Internet Group Multicast Protocol (IGMP) Join request indicating the selected channel to an access switch/router system via an Internet Protocol Television (IPTV) access network. Proceeding to block 704, the set-top box device receives data cached at the access switch/router system for the selected channel. Continuing to block 706, the set-top box device is joined to a multicast stream sent by a video acquisition server (A-server) associated with the selected channel. The method terminates at 708.

Figure 8:
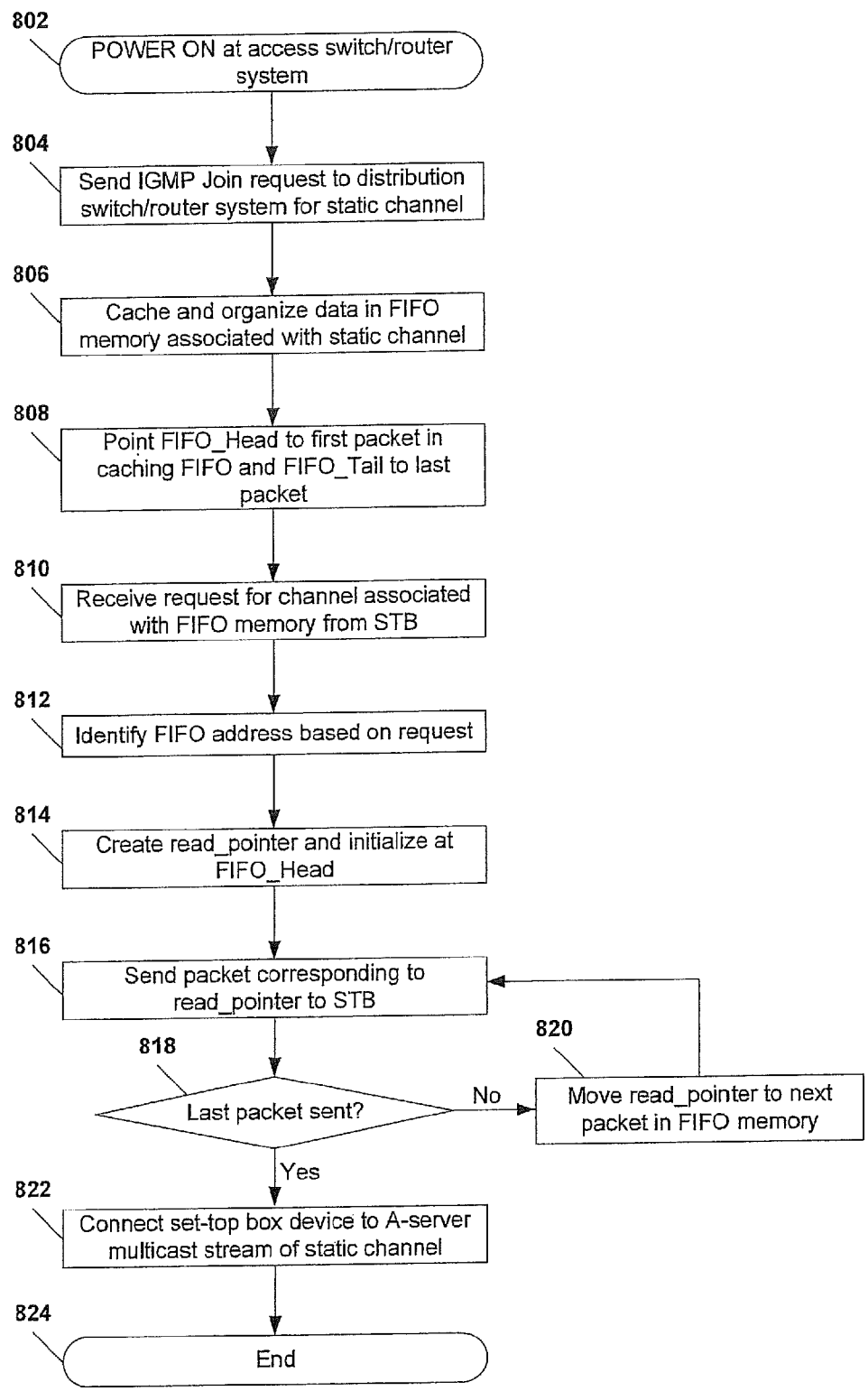
FIG. 8 is a flow diagram of a third particular embodiment of a method of delivering video content.

Referring to FIG. 8, a third particular embodiment of a method of delivering video content is illustrated. At block 802, an access switch/router system of an Internet Protocol Television (IPTV) network powers on. The access switch/router system can include one or more servers, one or more switches, one or more routers, or any combination thereof. In a particular embodiment, the access switch/router system can be a digital subscriber line access multiplexer (DSLAM). Moving to block 804, the access switch/router system sends an Internet Group Multicast Protocol (IGMP) Join request packet to a distribution switch/router system for a static channel. Static channels include channels cached at the access switch/router system whether or not any set-top box communicating with the access switch/router system is tuned to any of the static channel(s).

Proceeding to block 806, the access switch/router system caches and organizes data associated with the static channel in a first-in first-out (FIFO) memory portion at the access switch/router system. The data can be organized such that the first data packet in the caching FIFO is a first random access point (RAP) packet associated with the static channel, and where each other packet is ordered after the initial RAP packet according to when it was received. Continuing to block 808, a FIFO-HEAD pointer can be pointed to the first packet in the caching FIFO, and a FIFO_Tail_pointer can be pointed to the last packet in the caching FIFO.

At block 810, the access switch/router system can receive a request for the static channel associated with the caching FIFO from a set-top box device. Moving to block 812, the access switch/router system identifies the address of the caching FIFO based on the request. Proceeding to block 814, the access switch/router system creates a read_pointer for the caching FIFO and initializes the read_pointer at the FIFO_Head. Continuing to block 816, the access switch/router system sends the packet pointed to by the read_pointer to the set-top box device. Advancing to decision node 818, the access switch/router system determines whether the last packet in the caching FIFO has been sent to the set-top box device. For instance, the access switch/router system can count the packets sent to the set-top box device to determine if the packets have been sent or monitor the read_pointer to determine when it points to the same packet as the FIFO_Tail_pointer.

If the access switch/router system determines that the cached packets for the requested static channel have not been sent, the method can return to block 816. Whereas, if the access switch/router system determines that the cached packets have been sent, the method moves to block 822, and the access switch/router system connects the set-top box device with an A-server multicast stream of the static channel. The method terminates at 824.

Figure 9:
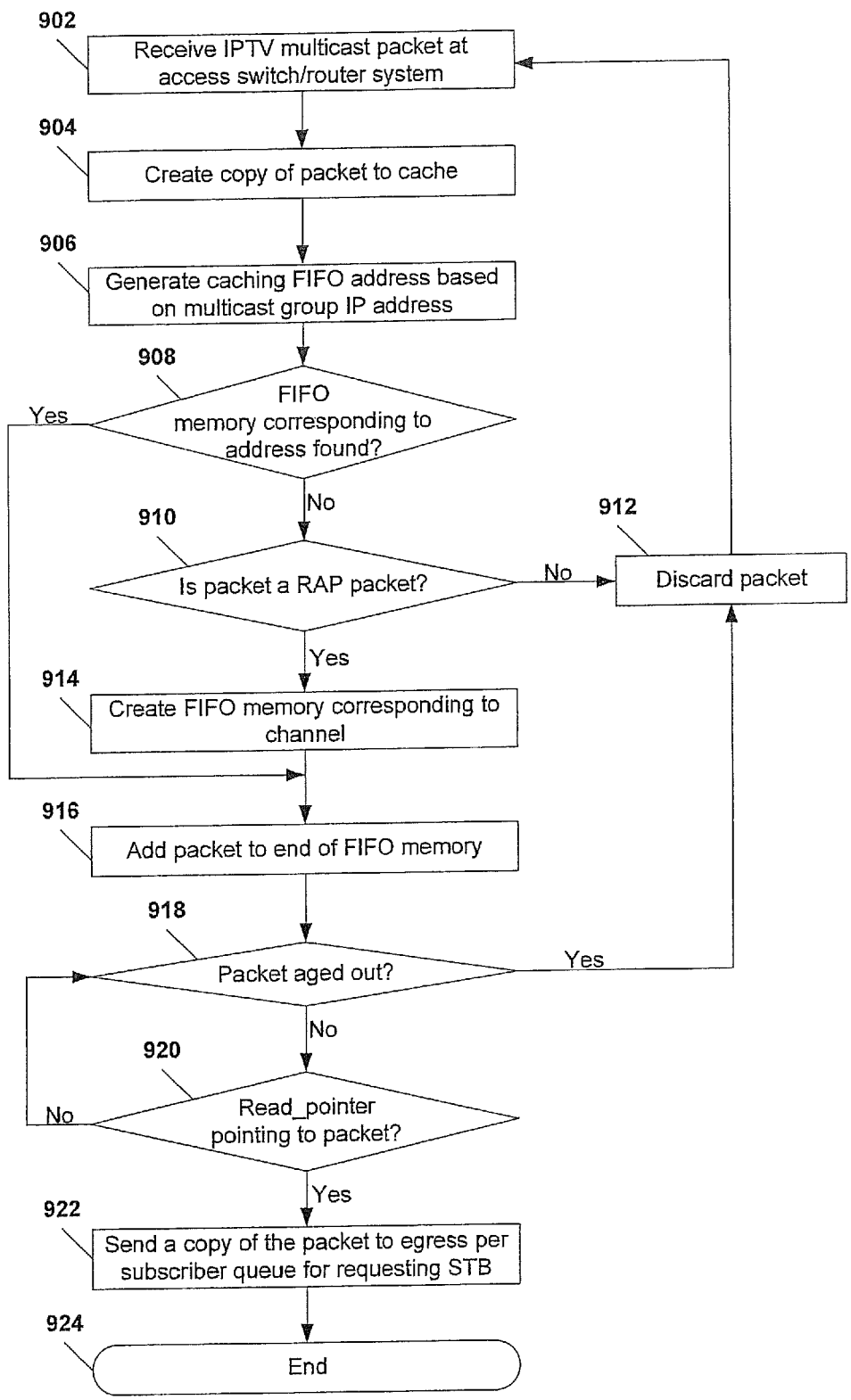
FIG. 9 is a flow diagram of a fourth particular embodiment of a method of delivering video content.

Referring to FIG. 9, a fourth particular embodiment of a method of delivering video content is illustrated. At block 902, an access switch/router system receives a multicast packet associated with an Internet Protocol Television (IPTV) channel. The access switch/router system can receive the packet from a distribution switch/router system or from a video acquisition server (A-server) that has been connected with the access switch/router system. Moving to block 904, the access switch/router system creates a copy of the packet to cache. Proceeding to block 906, the access switch/router system generates a caching first-in first-out (FIFO) address based on the multicast group IP address included in the packet.

Continuing to decision node 908, the access switch/router system determines whether a FIFO memory corresponding to the generated address is found at the access switch/router system. If a FIFO memory is found, the method advances to block 916. Conversely, if a corresponding FIFO memory is not found, the method moves to decision node 910, and the access switch/router system determines whether the packet is a random access point (RAP) packet. If the packet is not a RAP packet, the method proceeds to block 912, and the packet is discarded. The method can then return to block 902. On the other hand, if the packet is a RAP packet, the method continues to block 914, and the access switch/router system creates a FIFO memory corresponding to a channel associated with the RAP packet. The method then advances to block 916.

Advancing to block 916, the received multicast packet is added to the end of the FIFO memory in which it is cached. In a particular embodiment, if the packet is a RAP packet, it may also be assigned a RAP marker and a timer can be started for the packet. At decision node 918, the access switch/router system can determine whether the packet is aged out, i.e., has been in the caching FIFO longer than a configured length of time. If the access switch/router system determines that the packed is aged out, the packet can be discarded at 912. Whereas, if the packet is not aged out, the method moves to decision node 920, and the access switch/router system determines whether a read_pointer is pointing to the packet.

If a read_pointer is not pointing to the packet, the method can return to decision node 918. Conversely, if the read_pointer is pointing to the packet, the method continues to block 922, and the access switch/router system sends a copy of the packet to a set-top box device requesting a channel associated with the caching FIFO in which the packet is stored. The method terminates at 924.

Figure 10:
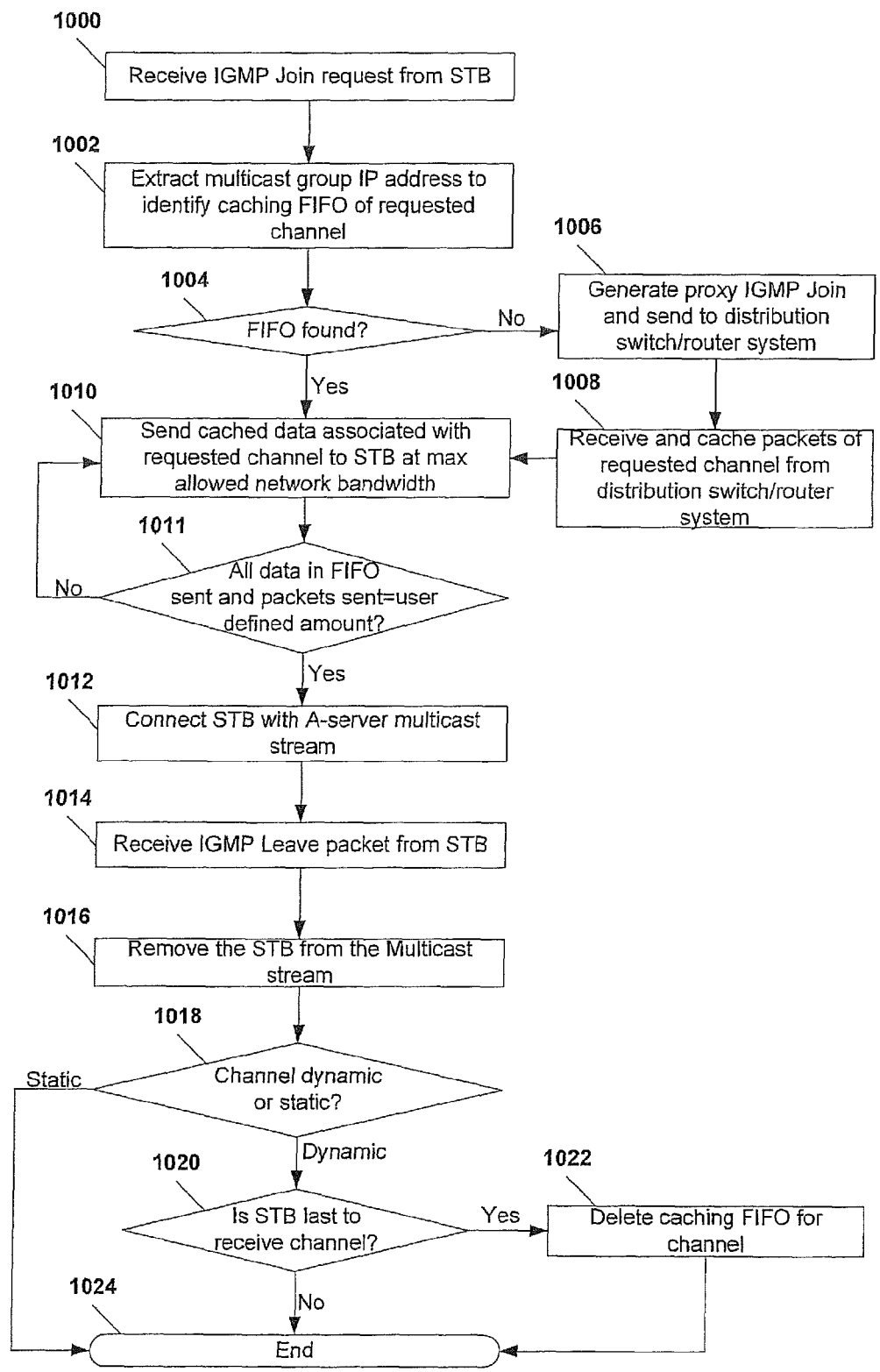
FIG. 10 is a flow diagram of a fifth particular embodiment of a method of delivering video content.

Referring to FIG. 10, a fifth particular embodiment of a method of delivering video content is illustrated. At block 1000, an Internet Group Multicast Protocol (IGMP) Join request is received from a set-top box device at an access switch/router system, such as an access switch/router system. Moving to block 1002, the access switch/router system extracts a multicast group IP address from the IGMP Join request to identify a caching first-in first-out (FIFO) memory associated with the requested channel. Proceeding to decision node 1004, the access switch/router system determines whether a caching FIFO is found at the access switch/router system for the requested channel.

If the access switch/router system determines that the caching FIFO exists at the access switch/router system, the method continues to block 1010. On the other hand, if the access switch/router system determines that a caching FIFO does not exist at the access switch/router system for the requested channel, the method moves to block 1006. At block 1006, the access switch/router system generates a proxy IGMP Join request indicating the requested channel and sends the proxy IGMP Join request to an upstream distribution system (e.g., a central office device or system) on behalf of the set-top box device. Moving to block 1008, the access switch/router system receives packets of the requested channel from the distribution system and caches the packets in a newly created caching FIFO at the access switch/router system. The method then continues to block 1010.

Continuing to block 1010, the access switch/router system sends cached data associated with the requested channel to the set-top box device. Advancing to decision node 1011, in a particular embodiment, the access switch/router system can determine whether the data in the caching FIFO has been sent. In addition, the access switch/router system can determine whether the amount of packets sent to the set-top box device includes a user-defined amount (such as an amount designated by a service provider). If at least one of the conditions is not met, the method returns to block 1010. Whereas, if both conditions have been met, the method progresses to block 1012.

Progressing to block 1012, the access switch/router system connects the set-top box device with a multicast stream sent by a video acquisition server (A-server) for the requested channel after the cached packets are sent to the set-top box device by the access switch/router system. At block 1014, in a particular embodiment, the access switch/router system can receive an IGMP Leave packet from the set-top box device after it has joined to the A-server multicast stream. Moving to block 1016, in an illustrative embodiment, the access switch/router system can remove the set-top box device from the A-server multicast stream.

Proceeding to decision node 1018, in a particular embodiment, the access switch/router system can determine whether the channel that was requested by the set-top box device is statically or dynamically cached at the access switch/router system. If the channel is statically cached, the method terminates at 1024. Whereas, if the channel is dynamically cached, the method continues to decision node 1020, and the access switch/router system determines whether the set-top box device is the last to receive the channel. If the access switch/router system determines that the set-top box device is the last to receive the channel, the method advances to block 1022, and the access switch/router system deletes the caching FIFO for the channel. The method terminates at 1024.

Figure 11:
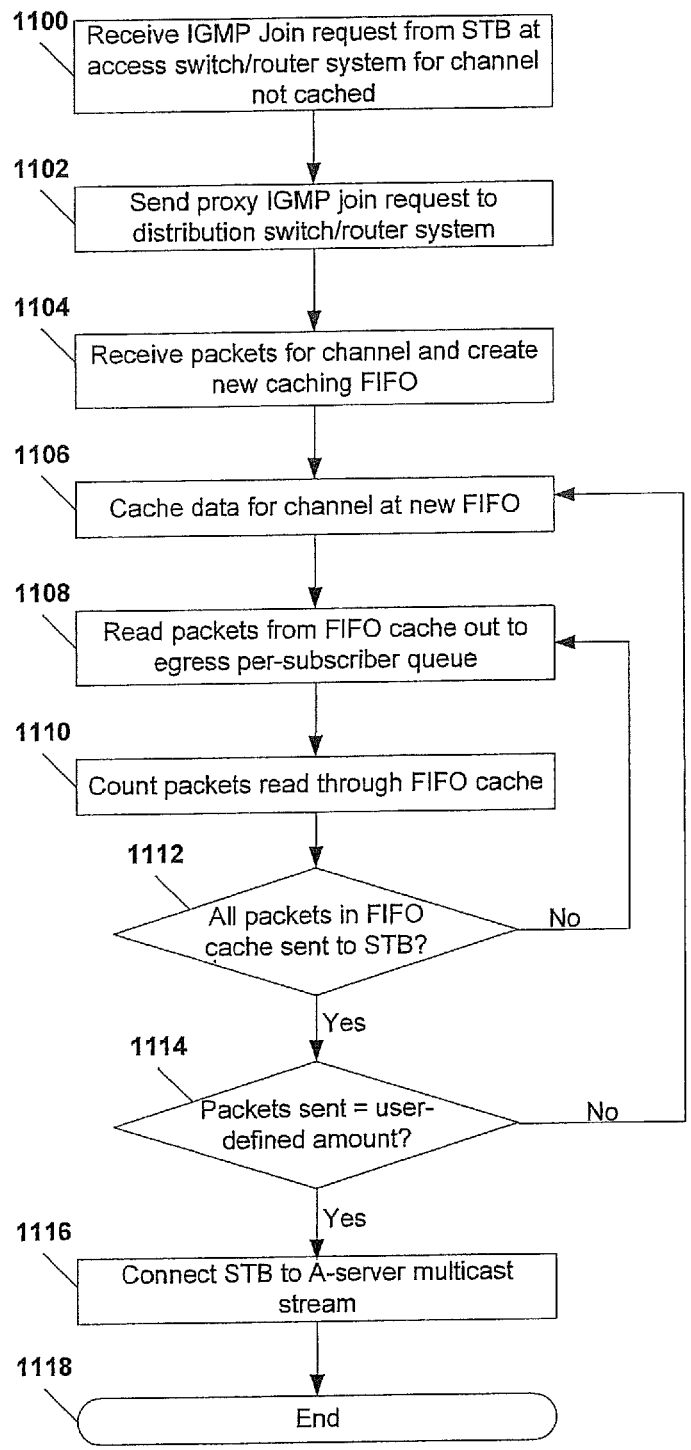
FIG. 11 is a flow diagram of a sixth particular embodiment of a method of delivering video content.

Referring to FIG. 11, a sixth particular embodiment of a method of delivering video content is illustrated. At block 1100, an access switch/router system receives an Internet Group Multicast Protocol (IGMP) Join request from a set-top box device at for a channel not cached at the access switch/router system. Moving to block 1102, the access switch/router system sends a proxy IGMP Join request for the channel, on behalf of the set-top box device, to a distribution switch/router system, such as a system or device at a central office (CO) of an Internet Protocol Television (IPTV) network. Proceeding to block 1104, the access switch/router system receives packets associated with the channel and creates a new first-in first-out (FIFO) cache for the channel. Continuing to block 1106, the access switch/router system caches the packets in the created FIFO cache.

Advancing to block 1108, the access switch/router system reads the packets from the FIFO cache out to an egress per-subscriber queue communicating with the set-top box device via an Internet Protocol Television (IPTV) access network. At block 1110, in a particular embodiment, the access switch/router system can count the number of packets read through the FIFO cache to the egress per-subscriber queue. Moving to decision node 1112, the access switch/router system determines whether the packets in the FIFO cache have been sent to the set-top box device. If the access switch/router system determines that the packets have not been sent, the method can return to block 1108. Conversely, if the access switch/router system determines that the packets in the FIFO cache have been sent, the method can proceed to decision node 1114.

Proceeding to decision node 1114, the access switch/router system determines whether the packets sent to the set-top box device include a user-defined amount of packets. If the access switch/router system determines that the packets sent to the set-top box device do not include the user-defined amount of packets, the method can return to 1106. On the other hand, if access switch/router system determines that the packets sent to the set-top box device include the user-defined amount of packets, the method continues to block 1116, and the access switch/router system connects the set-top box device with an A-server multicast stream of the requested channel. The method terminates at 1118.

Figure 12:
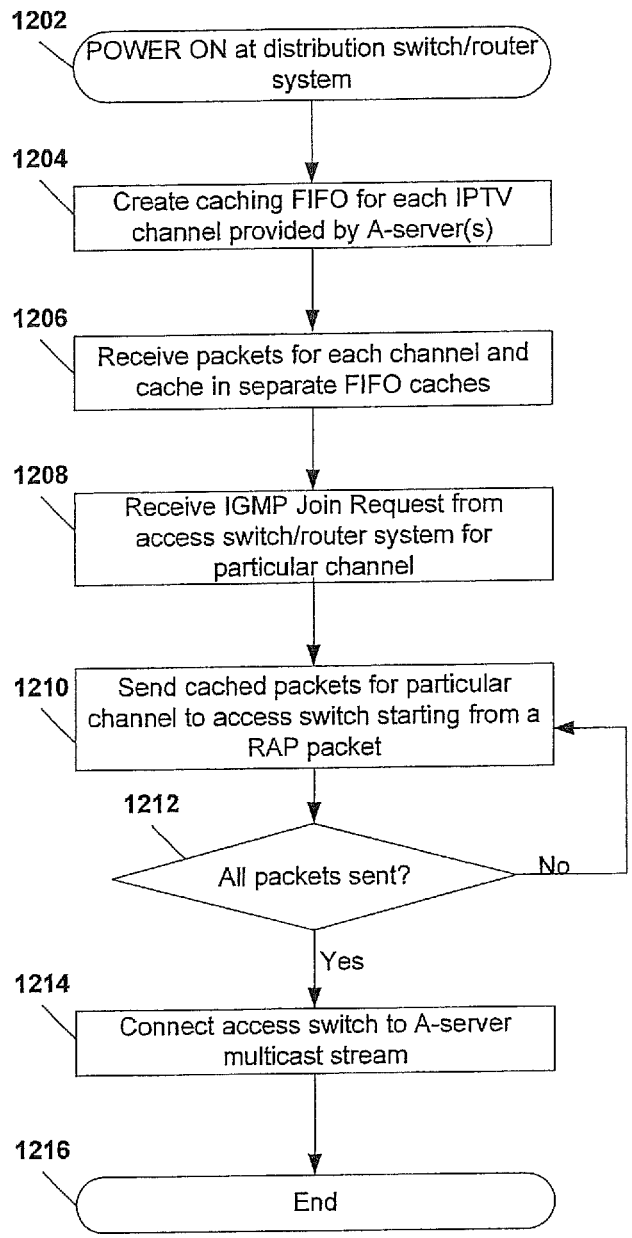
FIG. 12 is a flow diagram of a seventh particular embodiment of a method of delivering video content.

Referring to FIG. 12, a seventh particular embodiment of a method of delivering video content is illustrated. At block 1202, a distribution switch/router system powers on. The distribution switch/router system can include one or more servers, one or more routers, one or more switches, or any combination thereof. Moving to block 1204, the distribution switch/router system creates a caching first-in first-out memory (FIFO) for each Internet Protocol Television (IPTV) channel provided by one or more video acquisition servers (A-servers) communicating with the distribution switch/router system. Proceeding to block 1206, the distribution switch/router system receives packets associated with each channel from the A-server(s) and caches the packets for each channel in a separate caching FIFO.

Continuing to block 1208, the distribution switch/router system receives a proxy Internet Group Multicast Protocol (IGMP) Join request from an access switch/router system indicating a channel requested by a set-top box device. Advancing to block 1210, the distribution switch/router system sends cached packets of the indicated channel to the access switch/router system via a private IP network. At decision node 1212, the distribution switch/router system determines whether the cached packets associated with the channel have been sent to the access switch/router system. If the cached packets have not been sent, the method returns to block 1210. Whereas, if the cached packets have been sent, the method moves to block 1214, and the distribution switch/router system connects the access switch/router system with an A-server multicast stream for the channel. The method terminates at 1216.

Figure 13:
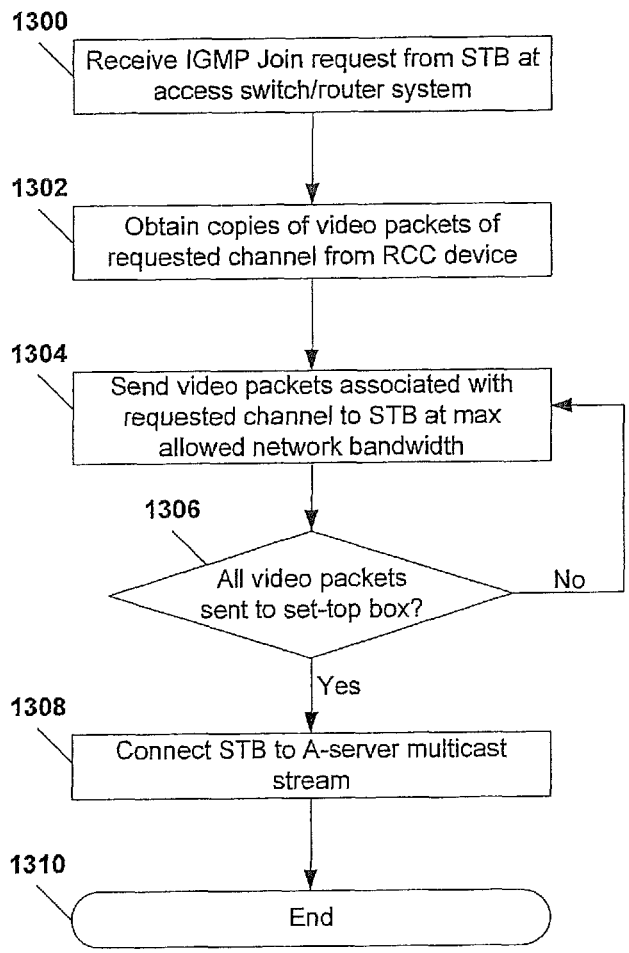
FIG. 13 is a flow diagram of a eighth particular embodiment of a method of delivering video content.

Referring to FIG. 13, an eighth particular embodiment of a method of delivering video content is illustrated. At block 1300, an access switch/router system of an Internet Protocol Television (IPTV) network receives an Internet Group Multicast Protocol (IGMP) request related to a particular channel from a set-top box device. Moving to block 1302, the access switch/router system obtains copies of video data packets associated with the requested channel from a rapid channel change device. The rapid channel change device can be coupled to the access switch/router device (as a separate device or an expansion card) or can communicate with the access switch/router device (as a separate network entity). The rapid channel change device includes a plurality of video caches, each of which caches video data for one of a plurality of IPTV channels.

Proceeding to block 1304, the access switch/router device sends copies of the video packets to the requesting set-top box device. The copies may be the copies received from the rapid channel change device or may be additional copies made at the access switch/router device. Continuing to decision node 1306, the access switch/router device can determine whether copies of the cached video packets for the requested channel have been sent to the requesting set-top box device. If copies of the packets have not been sent, the method returns to block 1304. Conversely, if the packets have been sent to the set-top box device, the method advances to block 1308, and the access switch/router device can connect the set-top box device with an A-server multicast stream for the requested channel. In one embodiment, the access switch/router system can join to the A-server multicast stream via the rapid channel change device prior to joining the set-top box device to the A-server multicast stream. The method terminates at 1310.

Figure 14:
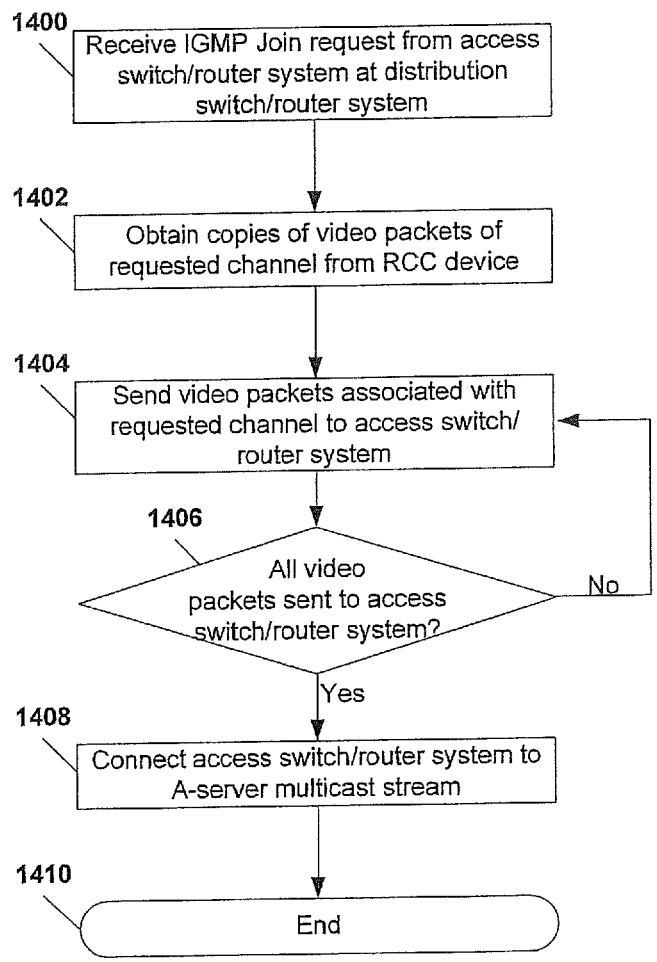
FIG. 14 is a flow diagram of a ninth particular embodiment of a method of delivering video content.

Referring to FIG. 14, a ninth particular embodiment of a method of delivering video content is illustrated. At block 1400, a distribution switch/router system of an Internet Protocol Television (IPTV) network receives an Internet Group Multicast Protocol (IGMP) request related to a particular channel from an access switch/router system. Moving to block 1402, the distribution switch/router system obtains copies of video data packets associated with the requested channel from a rapid channel change device. The rapid channel change device can be coupled to the distribution switch/router device (as a separate device or an expansion card) or can communicate with the distribution switch/router device (as a separate network entity). The rapid channel change device includes a plurality of video caches, each of which caches video data for one of a plurality of IPTV channels, where the plurality of IPTV channels includes a plurality of channels available to set-top box devices communicating with the access switch/router system.

Proceeding to block 1404, the distribution switch/router device sends copies of the video packets to the access switch/router system. The copies may be the copies received from the rapid channel change device or may be additional copies made at the distribution switch/router device. Continuing to decision node 1406, the distribution switch/router device can determine whether copies of the cached video packets for the requested channel have been sent to the access switch/router system. If copies of the packets have not been sent, the method returns to block 1404. Conversely, if the packets have been sent to the access switch/router system, the method advances to block 1408, and the distribution switch/router device can connect the access switch/router system with an A-server multicast stream for the requested channel. In one embodiment, the distribution switch/router system can join to the A-server multicast stream via the rapid channel change device prior to joining the access switch/router system to the A-server multicast stream. The method terminates at 1410.

Figure 15:
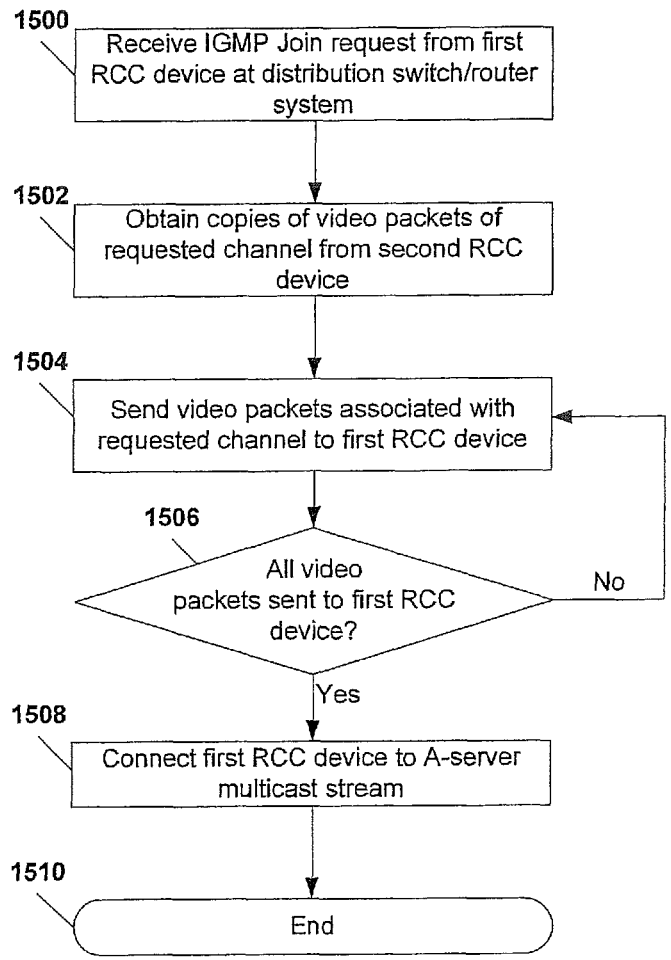
FIG. 15 is a flow diagram of a tenth particular embodiment of a method of delivering video content.

Referring to FIG. 15, a tenth particular embodiment of a method of delivering video content is illustrated. At block 1500, a distribution switch/router system of an Internet Protocol Television (IPTV) network receives an Internet Group Multicast Protocol (IGMP) request related to a particular channel from a first rapid channel change device coupled to the distribution switch/router system and to an access switch/router system. Moving to block 1502, the distribution switch/router system obtains copies of video data packets associated with the requested channel from a second rapid channel change device. Proceeding to block 1504, the distribution switch/router device sends copies of the video packets to the first rapid channel change device. The copies may be the copies received from the rapid channel change device or may be additional copies made at the distribution switch/router device.

Continuing to decision node 1506, the distribution switch/router device can determine whether copies of the cached video packets for the requested channel have been sent to the first rapid channel change device. If copies of the packets have not been sent, the method returns to block 1504. Conversely, if the packets have been sent to the first rapid channel change device, the method advances to block 1508, and the distribution switch/router device can connect the first rapid channel change device with an A-server multicast stream for the requested channel. In one embodiment, the distribution switch/router system can join to the A-server multicast stream via the second rapid channel change device prior to joining the access switch/router system to the A-server multicast stream. The method terminates at 1510.

Figure 16:
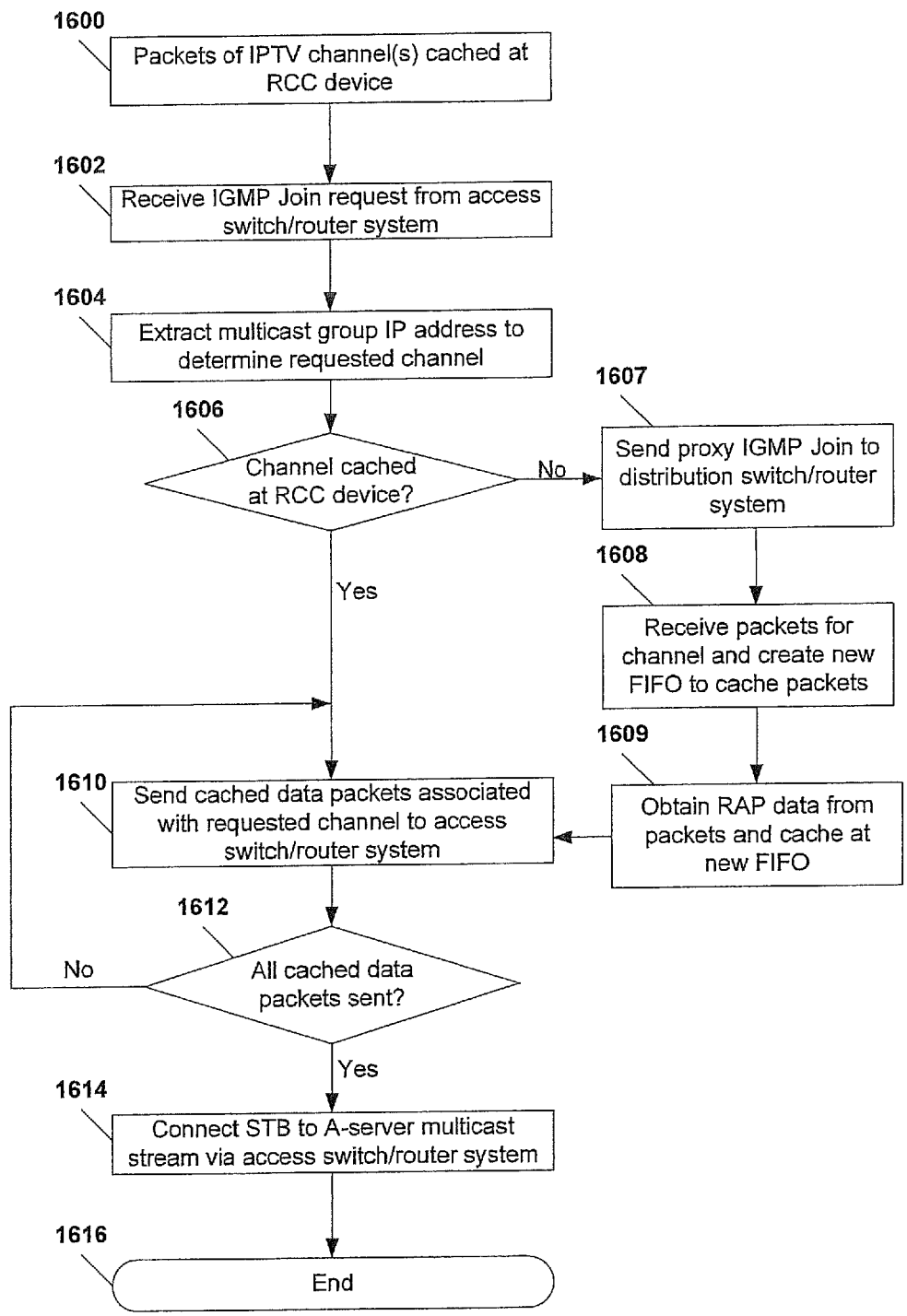
FIG. 16 is a flow diagram of a eleventh particular embodiment of a method of delivering video content.

Referring to FIG. 16, an eleventh particular embodiment of a method of delivering video content is illustrated. At block 1600, a rapid channel change device caches data packets corresponding to one or more Internet Protocol Television (IPTV) channels. Moving to block 1602, the rapid channel change device receives an Internet Group Multicast Protocol (IGMP) Join request from an access switch/router system. The IGMP Join request indicates a channel selected at a set-top box device communicating with the access switch/router system. Proceeding to block 1604, in a particular embodiment, the rapid channel change device extracts a multicast group IP address from the IGMP Join request to determine the requested channel.

Continuing to decision node 1606, the rapid channel change device determines whether data of the requested channel is cached at the rapid channel change device. If the rapid channel change device determines that data of the requested channel is cached at the rapid channel change device, the method advances to block 1610. Conversely, if the rapid channel change device determines that data of the requested channel is not cached at the rapid channel change device, the method moves to block 1607. At block 1607, the rapid channel change device sends a proxy IGMP Join request for the requested channel to a distribution switch/router system. Moving to block 1608, the rapid channel change device receives packets for the requested channel and creates a new cache, such as a first-in first-out (FIFO) cache, to store the packets. Continuing to block 1609, the rapid channel change device obtains random access point (RAP) data for the requested channel for storage in the new cache. The method then proceeds to block 1610.

Proceeding to block 1610, the rapid channel change device sends cached data associated with the requested channel to the access switch/router system. Continuing to decision node 1612, the rapid channel change device determines whether the cached packets for the requested channel have been sent to the access switch/router system. If the packets have not been sent, the method can return to block 1610. On the other hand, if the packets have been sent, the method advances to block 1614, and the rapid channel change device can connect the set-top box device with a multicast stream of a video acquisition server (A-server) associated with the requested channel, via the access switch/router system. The method terminates at 1616.

Figure 17:
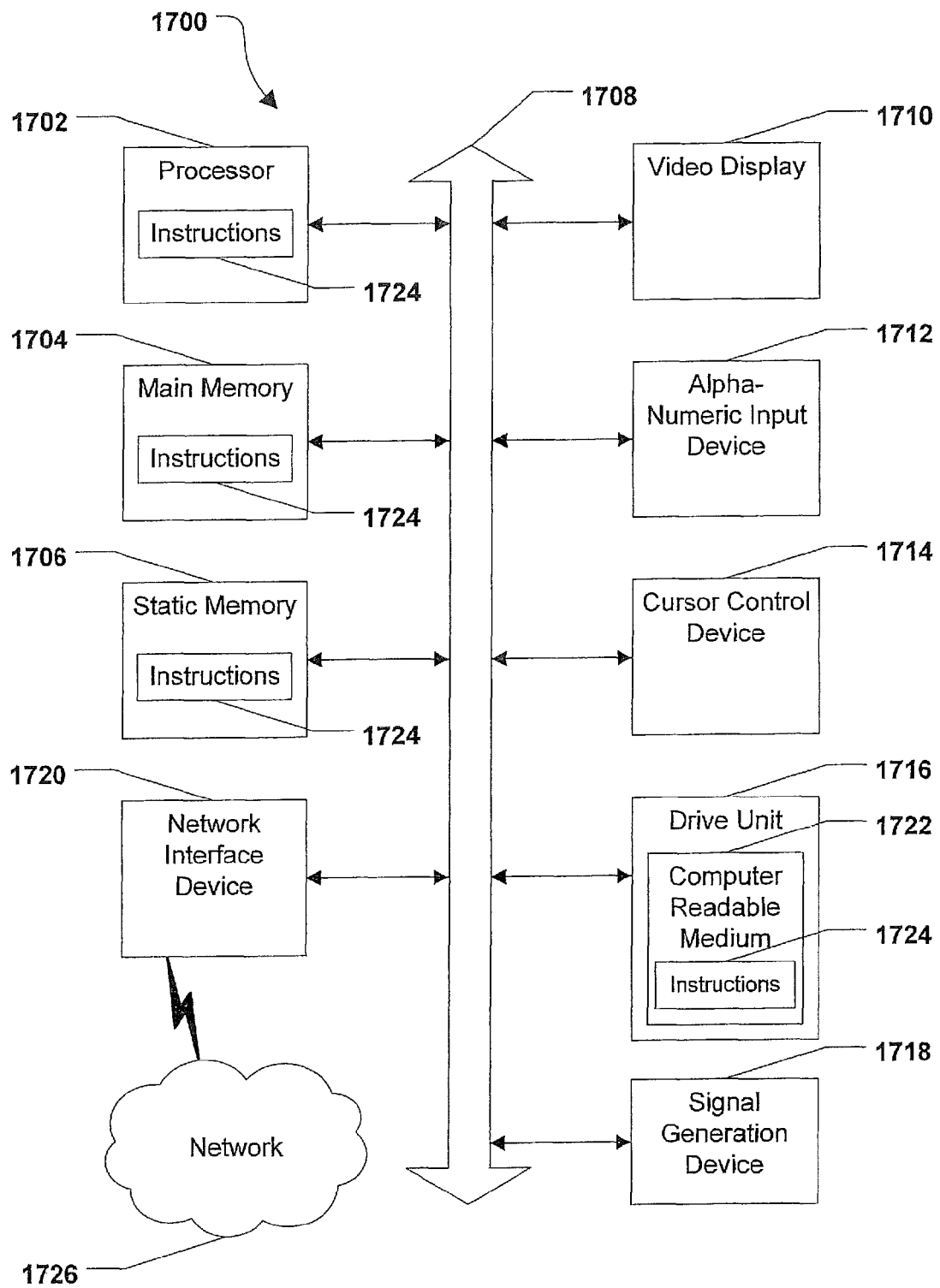
FIG. 17 is a block diagram of an illustrative embodiment of a general computer system.

Referring to FIG. 17, an illustrative embodiment of a general computer system is shown and is designated 1700. The computer system 1700 can include a set of instructions that can be executed to cause the computer system 1700 to perform any one or more of the methods or computer based functions disclosed herein. The computer system 1700 may operate as a standalone device or may be connected, e.g., using a network, to other computer systems or peripheral devices, such as access switch/router system systems (including servers, switches, routers, or any combination thereof), distribution switch/router system systems (including servers, switches, routers, or any combination thereof), video acquisition servers, set-top box devices, or other servers or systems, as illustrated in FIGS. 1-2.

In a networked deployment, the computer system may operate in the capacity of a server or as a client user computer in a server-client user network environment, or as a peer computer system in a peer-to-peer (or distributed) network environment. The computer system 1700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1700 can be implemented using electronic devices that provide voice, video or data communication. Further, while a single computer system 1700 is illustrated, the term "system" shall also be taken to include any collection of systems or sub-systems that individually or jointly execute a set, or multiple sets, of instructions to perform one or more computer functions.

As illustrated in FIG. 17, the computer system 1700 may include a processor 1702, e.g., a central processing unit (CPU), a graphics processing unit (GPU), or both. Moreover, the computer system 1700 can include a main memory 1704 and a static memory 1706 that can communicate with each other via a bus 1708. As shown, the computer system 1700 may further include a video display unit 1710, such as a liquid crystal display (LCD), an organic light emitting diode (OLED), a flat panel display, a solid state display, or a cathode ray tube (CRT). Additionally, the computer system 1700 may include an input device 1712, such as a keyboard, and a cursor control device 1714, such as a mouse. The computer system 1700 can also include a disk drive unit 1716, a signal generation device 1718, such as a speaker or remote control, and a network interface device 1720.

In a particular embodiment, as depicted in FIG. 17, the disk drive unit 1716 may include a computer-readable medium 1722 in which one or more sets of instructions 1724, e.g. software, can be embedded. Further, the instructions 1724 may embody one or more of the methods or logic as described herein. In a particular embodiment, the instructions 1724 may reside completely, or at least partially, within the main memory 1704, the static memory 1706, and/or within the processor 1702 during execution by the computer system 1700. The main memory 1704 and the processor 1702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1724 so that a device connected to a network 1726 can communicate voice, video or data over the network 1726. Further, the instructions 1724 may be transmitted or received over the network 1726 via the network interface device 1720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage devices. Accordingly, the disclosure is considered to include any one or more of a computer-readable medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments that fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving data from a set-top box device at an access system via an access network, the data indicating a selection of a channel at the set-top box device, the data including a multicast group address;
   sending copies of video data packets from the access system for storage in a video data cache associated with the channel, the video data cache comprising a first-in first-out cache;
   automatically connecting the set-top box device to a multicast stream of the channel after a particular number of video data packets are sent to the set-top box device from the video data cache, wherein the particular number of video data packets is based on an aging criterion of access point packets of the channel, wherein a particular access point packet of the access point packets is stored in the video data cache, wherein a head of the video data cache corresponds to the particular access point packet based on the aging criterion, and wherein the particular number of data packets is less than a capacity of the video data cache; and
   deleting an association between the video data cache and the channel in response to determining that a leave request has been received from each of a plurality of set-top box devices, wherein the leave request indicates that a corresponding set-top box device is to stop receiving the channel and wherein the plurality of set-top box devices includes the set-top box device.

2. The method of claim 1, further comprising, in response to determining that an aging timer of a second access point packet of the access point packets satisfies the aging criterion, changing the head of the video data cache to correspond to the second access point packet, wherein the second access point packet is stored in the video data cache, and wherein the video data cache is stored at the access system.

3. The method of claim 1, wherein the video data cache is stored at a rapid channel change device coupled to the access system.

4. The method of claim 1, wherein the video data cache is stored at an expansion card coupled to the access system.

5. The method of claim 1, wherein the data indicating the selection of the channel comprises a multicast join request.

6. The method of claim 5, further comprising extracting a multicast group address from the multicast join request and identifying the channel based on the multicast group address.

7. The method of claim 1, wherein the video data packets are sent to the set-top box device using a maximum available bandwidth of the access network.

8. A computer-readable storage device storing instructions that, when executed by a computer, cause the computer to perform operations comprising:
   receiving data from an access system at a distribution system of a television network, the data indicating a selection of one of a plurality of channels at a set-top box device, the data including a multicast group internet protocol address;
   sending copies of video data packets of the channel from the distribution system to a video memory accessible to the access system, wherein copies of the video data packets are accessible to a plurality of set-top box devices via the access system, the video memory comprising a video cache associated with the channel, wherein the plurality of set-top box devices includes the set-top box device; and deleting an association between the video cache and the channel in response to determining that a leave request has been received from each of the plurality of set-top box devices, wherein the leave request indicates that a corresponding set-top box device is to stop receiving the channel.

9. The computer-readable storage device of claim 8, wherein the video memory is included at a memory of the access system.

10. The computer-readable storage device of claim 8, wherein the video memory is included at a rapid channel change device coupled to the access system and to the distribution system.

11. The computer-readable storage device of claim 8, wherein the video memory is included at an expansion card coupled to the access system.

12. The computer-readable storage device of claim 8, wherein the video data packets are cached at the video cache.

13. The computer-readable storage device of claim 8, wherein the operations further comprise receiving the video data packets from a rapid channel change device coupled to the distribution system, wherein the video data packets are cached at the rapid channel change device.

14. The computer-readable storage device of claim 13, wherein the distribution system communicates with the rapid channel change device via the television network.

15. The computer-readable storage device of claim 13, wherein the rapid channel change device comprises an expansion card coupled to the distribution system.

16. A system comprising:
a processor;
a plurality of caches, each cache configured to store video data packets of a corresponding one of a plurality of television channels, each cache having a cache address; and
a memory storing instructions executable by the processor to perform operations including:
receiving data from an access system, the data indicating a selection of a television channel by a set-top box device;
generating a particular cache address based on a multicast group address included in the data;
searching the plurality of caches for the particular cache address;
sending copies of the stored video data packets of the selected television channel to the access system, wherein the copies of the video data packets are accessible to plurality of set-top box devices via the access system, wherein the plurality of set-top box devices includes the set-top box device; and
deleting an association between a particular cache and the television channel in response to determining that a leave request has been received from each of the plurality of set-top box devices, wherein the leave request indicates that a corresponding set-top box device is to stop receiving the television channel.

17. The system of claim 16, wherein the processor is integrated into a rapid channel change device coupled to the access system and to a distribution system.

18. The system of claim 17, wherein the operations further include receiving the video data packets from the distribution system.

19. The system of claim 17, wherein the rapid channel change device is integrated into an expansion card.

20. The system of claim 16, wherein the data indicating the selection of the television channel comprises a multicast join request.

* * * * *